US 7,126,951 B2

(12) United States Patent
Belcea et al.

(10) Patent No.: US 7,126,951 B2
(45) Date of Patent: Oct. 24, 2006

(54) SYSTEM AND METHOD FOR IDENTIFYING THE FLOOR NUMBER WHERE A FIREFIGHTER IN NEED OF HELP IS LOCATED USING RECEIVED SIGNAL STRENGTH INDICATOR AND SIGNAL PROPAGATION TIME

(75) Inventors: John M. Belcea, West Melbourne, FL (US); Shawn P. Welsh, Maitland, FL (US); Allen M. Roberson, Altamonte Springs, FL (US); Philip J. Hill, Oviedo, FL (US); Jeffrey C. Schmidt, Orlando, FL (US); Sa'Ed A'Rafat, Winter Springs, FL (US); James Green, Winter Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 10/861,121

(22) Filed: Jun. 4, 2004

(65) Prior Publication Data
US 2004/0246926 A1 Dec. 9, 2004

Related U.S. Application Data

(60) Provisional application No. 60/546,942, filed on Feb. 24, 2004, provisional application No. 60/476,167, filed on Jun. 6, 2003, provisional application No. 60/476,232, filed on Jun. 6, 2003.

(51) Int. Cl.
H04L 12/28 (2006.01)
H04M 11/04 (2006.01)
H04Q 7/20 (2006.01)

(52) U.S. Cl. ............... 370/400; 455/404.2; 455/456.6; 455/457

(58) Field of Classification Search ................ 370/328, 370/329, 331, 332, 400, 252; 455/456.1, 455/456.3, 456.5, 456.6, 457, 404.2
See application file for complete search history.

(56) References Cited

U.S. PATENT DOCUMENTS 4,494,192 A 1/1985 Lew et al.

(Continued)

FOREIGN PATENT DOCUMENTS

CA 2132180 3/1996

(Continued)

OTHER PUBLICATIONS

N.Patwari, R. J.O'Dea, and Y.Wang, "Relative location in wireless networks," in Proc. IEEE VTC, vol. 2, May 2001, pp. 1149-1153.*

(Continued)

*Primary Examiner*—Hassan Kizou
*Assistant Examiner*—Brian Roberts
(74) *Attorney, Agent, or Firm*—Randi L. Karpinia; Joseph J. Buczynski

(57) ABSTRACT

A system and method for deploying a network of wireless devices, including mobile terminals, wireless routers and a least one control console, within a three dimensional deployment area such as a building, so that communication, identification and position calculations of personnel, such as firefighters, using the mobile terminals can be achieved regardless of building structure. The wireless routers are deployed in a substantial vertical manner in staircases and elevator shafts of a building of interest, either in advance as part of a safety program or immediately upon arrival of firefighters or other team at the building during an emergency. The system and method according to the embodiment of the present invention described herein uses both TOF and RSSI between the mobile terminals and wireless routers to identify the floor numbers where firefighters are located and to track firefighter movements.

16 Claims, 19 Drawing Sheets

U.S. PATENT DOCUMENTS

| | | |
|---|---|---|
| 4,617,656 A | 10/1986 | Kobayashi et al. |
| 4,736,371 A | 4/1988 | Tejima et al. |
| 4,742,357 A | 5/1988 | Rackley |
| 4,747,130 A | 5/1988 | Ho |
| 4,910,521 A | 3/1990 | Mellon |
| 5,034,961 A | 7/1991 | Adams |
| 5,068,916 A | 11/1991 | Harrison et al. |
| 5,231,634 A | 7/1993 | Giles et al. |
| 5,233,604 A | 8/1993 | Ahmadi et al. |
| 5,241,542 A | 8/1993 | Natarajan et al. |
| 5,317,566 A | 5/1994 | Joshi |
| 5,392,450 A | 2/1995 | Nossen |
| 5,412,654 A | 5/1995 | Perkins |
| 5,424,747 A | 6/1995 | Chazelas |
| 5,502,722 A | 3/1996 | Fulghum |
| 5,517,491 A | 5/1996 | Nanni et al. |
| 5,555,425 A | 9/1996 | Zeller et al. |
| 5,555,540 A | 9/1996 | Radke |
| 5,572,528 A | 11/1996 | Shuen |
| 5,615,212 A | 3/1997 | Ruszczyk et al. |
| 5,618,045 A | 4/1997 | Kagan et al. |
| 5,621,732 A | 4/1997 | Osawa |
| 5,623,495 A | 4/1997 | Eng et al. |
| 5,627,976 A | 5/1997 | McFarland et al. |
| 5,631,897 A | 5/1997 | Pacheco et al. |
| 5,644,576 A | 7/1997 | Bauchot et al. |
| 5,652,751 A | 7/1997 | Sharony |
| 5,680,392 A | 10/1997 | Semaan |
| 5,684,794 A | 11/1997 | Lopez et al. |
| 5,687,194 A | 11/1997 | Paneth et al. |
| 5,696,903 A | 12/1997 | Mahany |
| 5,701,294 A | 12/1997 | Ward et al. |
| 5,706,428 A | 1/1998 | Boer et al. |
| 5,717,689 A | 2/1998 | Ayanoglu |
| 5,745,483 A | 4/1998 | Nakagawa et al. |
| 5,774,876 A | 6/1998 | Wooley et al. |
| 5,781,540 A | 7/1998 | Malcolm et al. |
| 5,787,080 A | 7/1998 | Hulyalkar et al. |
| 5,794,154 A | 8/1998 | Bar-On et al. |
| 5,796,732 A | 8/1998 | Mazzola et al. |
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,844,905 A | 12/1998 | McKay et al. |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |
| 5,905,450 A * | 5/1999 | Kim et al. .................. 340/967 |
| 5,909,651 A | 6/1999 | Chander et al. |
| 5,936,953 A | 8/1999 | Simmons |
| 5,943,322 A | 8/1999 | Mayer et al. |
| 5,987,011 A | 11/1999 | Toh |
| 5,987,033 A | 11/1999 | Boer et al. |
| 5,991,279 A | 11/1999 | Haugli et al. |
| 6,028,853 A | 2/2000 | Haartsen |
| 6,029,217 A | 2/2000 | Arimilli et al. |
| 6,034,542 A | 3/2000 | Ridgeway |
| 6,044,062 A | 3/2000 | Brownrigg et al. |
| 6,047,330 A | 4/2000 | Stracke, Jr. |
| 6,052,594 A | 4/2000 | Chuang et al. |
| 6,052,752 A | 4/2000 | Kwon |
| 6,064,626 A | 5/2000 | Stevens |
| 6,067,291 A | 5/2000 | Kamerman et al. |
| 6,067,297 A | 5/2000 | Beach |
| 6,078,566 A | 6/2000 | Kikinis |
| 6,104,712 A | 8/2000 | Robert et al. |
| 6,108,738 A | 8/2000 | Chambers et al. |
| 6,115,580 A | 9/2000 | Chuprun et al. |
| 6,122,690 A | 9/2000 | Nannetti et al. |
| 6,130,881 A | 10/2000 | Stiller et al. |
| 6,132,306 A | 10/2000 | Trompower |
| 6,147,975 A | 11/2000 | Bowman-Amuah |
| 6,163,699 A | 12/2000 | Naor et al. |
| 6,178,337 B1 | 1/2001 | Spartz et al. |
| 6,192,053 B1 | 2/2001 | Angelico et al. |
| 6,192,230 B1 | 2/2001 | Van Bokhorst et al. |
| 6,201,475 B1 * | 3/2001 | Stumberg et al. ........ 340/573.1 |
| 6,208,870 B1 | 3/2001 | Lorello et al. |
| 6,222,463 B1 | 4/2001 | Rai |
| 6,222,504 B1 | 4/2001 | Oby |
| 6,223,240 B1 | 4/2001 | Odenwald et al. |
| 6,240,294 B1 | 5/2001 | Hamilton et al. |
| 6,246,875 B1 | 6/2001 | Seaholtz et al. |
| 6,249,516 B1 | 6/2001 | Brownrigg et al. |
| 6,275,707 B1 | 8/2001 | Reed et al. |
| 6,285,892 B1 | 9/2001 | Hulyalkar |
| 6,304,556 B1 | 10/2001 | Haas |
| 6,327,300 B1 | 12/2001 | Souissi et al. |
| 6,349,091 B1 | 2/2002 | Li |
| 6,349,210 B1 | 2/2002 | Li |
| 6,359,872 B1 | 3/2002 | Mahany et al. |
| 6,366,568 B1 | 4/2002 | Bolgiano et al. |
| 6,405,049 B1 | 6/2002 | Herrod et al. |
| 6,895,333 B1 * | 5/2005 | Hethuin et al. ............. 701/215 |
| 6,952,574 B1 * | 10/2005 | Tealdi et al. ............. 455/404.2 |
| 2001/0053699 A1 | 12/2001 | McCrady et al. |
| 2002/0013856 A1 | 1/2002 | Garcia-Luna-Aceves |
| 2003/0214397 A1 * | 11/2003 | Perkins et al. ............... 340/524 |
| 2003/0214410 A1 * | 11/2003 | Johnson et al. .......... 340/573.4 |
| 2004/0082341 A1 * | 4/2004 | Stanforth ................. 455/456.1 |
| 2004/0185822 A1 * | 9/2004 | Tealdi et al. ............. 455/404.1 |
| 2004/0203380 A1 * | 10/2004 | Hamdi et al. ............... 455/41.2 |
| 2005/0001720 A1 * | 1/2005 | Mason et al. .......... 340/539.13 |
| 2005/0049821 A1 * | 3/2005 | Sahinoglu ................... 702/150 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

L.Doherty, K. S. J.pister, and L. E.Ghaoui, "Convex position estimation in wireless sensor networks," in Proc. IEEE INFOCOM, vol. 3, 2001, pp. 1655-1663.*

C.Savarese, J. M.Rabaey, and J.Beutel, "Locationing in distributed ad-hoc wireless sensor networks," in Proc. ICASSP, May 2001, pp. 2037-2040.*

J.Albowicz, A.Chen, and L.Zhang, "Recursive position estimation in sensor networks," in Proc. IEEE Int. Conf. Network Protocols, Nov. 2001, pp. 35-41.*

Wong, et al., "Soft Handoffs in CDMA Mobile Systems," Dec. 1997, IEEE Personal Communications.

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wirless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

\* cited by examiner

Legend Tab Expanded

Main View - Four Floor Indicating Routers "FIRs" Deployed
(Indicated by Green LED)

Ladder Unit on Floor 2 (Captian Only View)

Ladder Unit on Floor 2 (Show All Units View)

Personnel Alarm (Ladder 51) on Floor 2
Blinking Background + Audible Alarm Until Acknowlwdged Personnel Alarm (Ladder 51) on Floor 2
Alarm Acknowledged Personnel Alarm (Ladder 51) on Floor 2
Yellow Background Indicates MeshTrack Loss of Signal Floor 2 Expanded View
Loss of Signal on Unit B9340 (yellow background)
FIR "2C" Failure indicated by shaded background Units Deployed on Multiple Floors
(Show All Units View)

SYSTEM AND METHOD FOR IDENTIFYING THE FLOOR NUMBER WHERE A FIREFIGHTER IN NEED OF HELP IS LOCATED USING RECEIVED SIGNAL STRENGTH INDICATOR AND SIGNAL PROPAGATION TIME

The present application claims benefit under 35 U.S.C. § 119(e) from a U.S. Provisional Patent Application of John M. Belcea et al. entitled "System and Method for Identifying the Floor Number Where a Firefighter in Need of Help is Located Using Received Signal Strength Indicator and Signal Propagation Time", Ser. No. 60/546,942, filed on Feb. 24, 2004, from a U.S. Provisional Patent Application of John M. Belcea, entitled "System and Method for Accurately Computing the Position of Wireless Devices Inside High-Rise Buildings", Ser. No. 60/476,167, filed on Jun. 6, 2003, and from a U.S. Provisional Patent Application of John M. Belcea, entitled "MAC Protocol for Accurately Computing the Position of Wireless Devices Inside Buildings", Ser. No. 60/476,232, filed on Jun. 6, 2003, the entire contents of each application being incorporated herein by reference.

BACKGROUND OF THE INVENTION

1. Field of the Invention

The present invention relates to a system and method for accurately identifying the location of a mobile wireless device in a network, in particular, an ad-hoc wireless mobile communication network, using received signal strength indicator and signal propagation time. More particularly, the present invention relates to the employment of such a system and method in a real-world application, such as a fire and rescue scenario, to quickly and accurately identify the floor number where a firefighter in need of help is located.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc multi-hopping" network has been developed. In this type of network, each mobile node is capable of operating as a router for the other mobile nodes providing most of the functionality of a base station, thus expanding the coverage area with very little cost. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other fixed or mobile nodes, such as those on the public switched telephone network (PSTN), and on other networks such as the Internet. Details of these advanced types of ad-hoc multi-hopping networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each application being incorporated herein by reference.

Either in conventional wireless communications networks, or in ad-hoc wireless communications networks, it may be necessary or desirable for a mobile node to be capable of knowing or determining a relative or absolute geographic location or position. As known to those skilled in the art, this can be achieved through the use of a number of technologies. These technologies require cell identification, combined with Round Trip Time (RTT), Timing Advance (TA) and Measured Signal level (RX level), Time Difference of Arrival (TDOA) and Angle Of Arrival (AOA) techniques, the details of which can be appreciated by one skilled in the art. Another available technology uses cellular signal timing based methods for code division multiple access (CDMA) and wideband code division multiple access (WCDMA). Yet another technology uses Global Positioning System (GPS) techniques, which is generally viewed as being more accurate than all other methods listed.

Despite the fact that the GPS technique has been in use for a considerable period of time and most of the world's navigation relies on it, the GPS technique is very susceptible to large errors in measurement in some specific conditions. It can provide location determination results with very high accuracy only after performing a relatively large number of measurements involving a large number of satellites to remove propagation and method errors. A description of the shortcomings of GPS is set forth in a document by the Institute For Mathematics and its Applications (IMA) entitled "Mathematical Challenges in Global Positioning Systems (GPS)", the entire content of which being incorporated herein by reference. Certain other tests also demonstrate that the GPS technique is unsuitable for those terrestrial-based networks operating in an environment where the number of visible satellites is too small for providing good precision as in underground tunnels, inside buildings, under heavy foliage or in urban "canyons".

To overcome the above issues with determining location information, new techniques are being developed which do not require either the use of satellites or a centralized computing facility for determining location information. Further details of new techniques for computing location of a mobile terminal in ad-hoc multi-hopping networks are described in U.S. Pat. No. 6,728,545 entitled "System and Method for Computing the Location of a Mobile Terminal in a Wireless Communications Network", the entire contents of which is incorporated herein by reference. Additionally, ad-hoc networks can be developed utilizing non-fixed, or movable infrastructure components. Further details of networks using movable access points and repeaters for optimized coverage and capacity constraints are described in U.S. patent application Ser. No. 09/929,030 entitled "Movable Access Points and Repeaters for Minimizing Coverage and Capacity Constraints in a Wireless Communications Network and a Method for Using the Same", filed Aug. 15, 2001, the entire content being incorporated herein by reference.

The patent and patent applications discussed above generally relate to mobile networks that connect to a permanent fixed network where location information is presented as absolute locations. However, as can be appreciated from the patent applications referenced above, temporary ad-hoc multi-hopping networks do not necessarily have the same requirements. Therefore, a need exists for a portable, easily deployed, self-contained ad-hoc multi-hopping network system where relative location detection is desired, such as where the location of personnel operating in emergency condition is critical. The relative location may be provided in addition to, or in replacement of absolute geo-location, and should be readily communicable between and among various transmission obstacles typically present in such location.

Accordingly, a need exists for an improved system and method for easily determining and communicating the absolute and/or relative location of a mobile node in a deployed wireless communications network.

SUMMARY OF THE INVENTION

An object of the present invention is to provide a system and method for deploying a network of wireless devices, in particular, a mobile wireless ad-hoc peer-to-peer network, including mobile terminals, wireless routers and at least one controller, within a three dimensional deployment structure such as a building, so that communication, identification and position calculations can be achieved regardless of building structure.

Another object of the present invention is to deploy such a system in a real-world application, such as a fire and rescue scenario, to quickly and accurately identify the floor number where a firefighter in need of help is located.

These and other objects are substantially achieved by providing a wireless ad-hoc peer-to-peer communication network having a plurality of mobile terminals, a plurality of wireless routers, and at least one control console terminal. The mobile terminals are issued to firefighters as part of the standard equipment. Wireless routers are deployed in a substantial vertical manner in staircases and elevator shafts of a building of interest, either in advance as part of a safety program (e.g, coupled to the "Exit" signs on each floor) or immediately upon arrival at the building during an emergency. The system and method according to the embodiment of the present invention described herein uses both Time Of Flight (TOF) and Received Signal Strength Indicator (RSSI) between the mobile terminals and wireless routers to identify the floors where the firefighters are located and to track firefighter movements. The RSSI and TOF values received from all routers are filtered before being used for the evaluation of the floor number. Although the RSSI and TOF data may not show the correct distance to the firefighter, the filtered data can be compared for finding the most probable floor where the firefighter is located knowing that the closet router should provide the smallest TOF and the best RSSI simultaneously.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
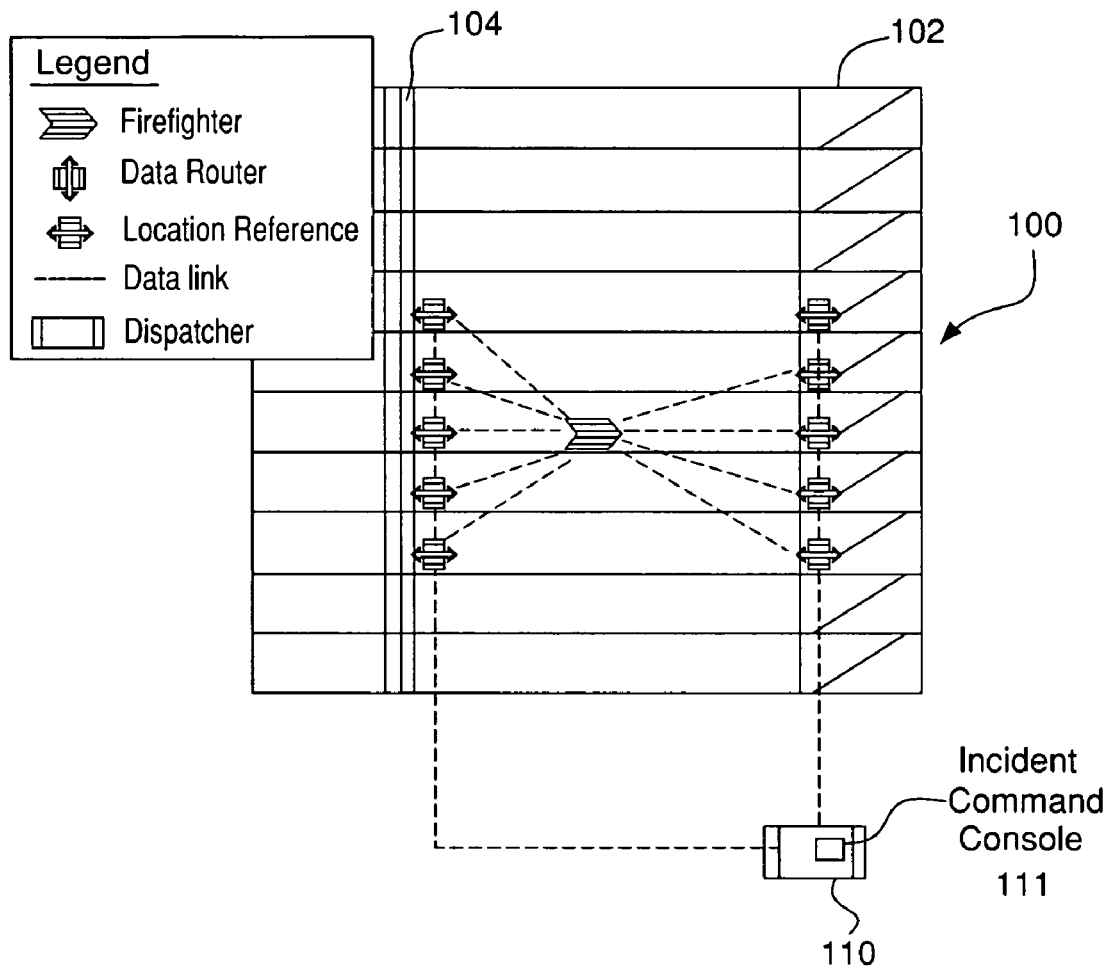
FIG. 1 is a conceptual diagram of a building having wireless routers of a system according to an embodiment of the present invention deployed therein.

As noted above, the location of personnel operating in emergency conditions is very important for many reasons. There have been cases when personnel, such as firefighters, are lost in smoke and become confused about the real position of themselves or others on the present or previous floors on which they were operating. The system and method described below is presented as one embodiment, which is configured for assuring the safety of firefighters. In yet another embodiment of the present invention, the system and method can be configured for supporting the activity of any number of other emergency or Special Forces deployments.

The incident and personnel management system according to an embodiment of the present invention described herein is designed to provide the means to track emergency personnel within an incident area, such as a burning building. Personnel location is reported by building floor and/or sector area. This system also provides access to real-time personnel location information and alert status indicators. Ancillary personnel data managed by the system includes attributes including unit number, name, assignment, and radio frequency.

A system of this type is made possible by employing the use of MEA™ wireless technology. This technology employs a plurality of wireless transceivers, such as the MeshNetworks™ WMC6300 wireless transceiver, and wireless ad-hoc, scalable routing technologies. The transceiver in this example utilizes a modem, such as MeshNetworks™ QDMA modem, to facilitate robust over-the-air data transmission, even in hostile RF environments. This transceiver, coupled with MeshNetworks™ Scalable Routing (MSR) protocol and geo-location solution, allows users instantly deploying dense, scalable, ad-hoc multi-hopping networks with no single point of failure. In summary, the system includes an ad-hoc, wireless, multi-hopping communications fabric capable of carrying voice, video and data, and further capable of calculating the relative position of certain elements that reside within the network boundary. The ad-hoc nature of this system is one of several attributes that make this system simple to deploy and capable of yielding complete connectivity between all network nodes to insure timely delivery of critical information to the Incident Command Console, even when subjected to harsh or constantly changing physical conditions.

As described in more detail below, the system further comprises, among other things, a MEA™ Incident Command Console (ICC), a plurality of Floor Indicating Routers (FIRs), and at least one MeshTracker™ (MT) Device. The MEA™ Incident Command Console includes a Windows based PC that incorporates a touch screen display, thus providing a simple user interface. The incident management application is executed on this PC and is connected to the MEA™ network fabric via a MEA™ wireless network card. The command console is entirely self-contained and intended to be monitored by personnel managing the incident scene, such as the leader of the Rapid Intervention Crew (RIC). The incident management application is intended to provide a graphical representation of real-time personnel location and identification information. Specifically, the data reported by the Incident Command Console includes the location of all personnel within the incident area; unit number, name, assignment of radio frequency; nearest FIR (typically an ingress/egress point) and range to each individual; ability to represent personnel by squad (via Captain/Squad Leader) or as individuals; alarm status of each individual as well as loss of network communication with an individual or loss of communication with a FIR.

A Floor Indicating Router (FIR) is a small portable device that employs the use of a FCC/UL certified MEA™ wireless transceiver card as discussed above. These devices are deployed as static reference points around the incident area. These devices are typically deployed by on-site personnel, such as an RIC, after they have arrived at the incident scene. FIRs are deployed in columns within stairwells and close to elevator shafts, that is, at ingress and egress points. Multiple FIR columns can be deployed as required to increase the radio coverage area and the reliability of the system. The FIR device in this example is portable, weighs less than 12 ounces and has a 5-hour battery life. The device operates in the $2^{nd}$ ISM band (2.40–2.48 GHz range) and has a transmit power of +25 dbm.

A MeshTracker™ (MT) Device is similar in form factor to the FIR, except it is intended to be employed as a mobile device, that is, a mobile terminal, carried by on-scene personnel for position tracking and accountability. The MeshTracker utilizes MEA™ location technology to calculate a relative position within the incident scene, which is accomplished by wireless interaction with FIR devices that have been deployed within the incident area as described in detail below. The MTs make use of the deployed FIRS and other MTs as an ad-hoc wireless communications fabric to relay vital information to the command console.

As discussed above, the fundamental technology that serves as the backbone and data delivery mechanism in this system is the MEA™, which is MeshNetworks'™ ad-hoc multihopping networking solution that allows deployments to be performed rapidly, without critical dependencies, using simple deployment guidelines. The network is deployed using one of two methods, namely, the network infrastructure components (FIRs) could be pre-deployed, as part of a building management and safety system (e.g, coupled to the "Exit" signs on each floor), or could be deployed as an incident occurs. Regardless of when the network is deployed, the deployment guidelines are the same, as will now be discussed.

First, a command post is established, which is the location where the command post is deployed and the incident is managed via the Incident Command Console (ICC). This location should allow wireless connectivity to at least two FIRs within the incident area. Connectivity between the command console and the FIR network can be attained at ranges of several hundred to several thousand feet.

FIRs are deployed in columns outside of ingress and egress points (typically near or inside stairwells and/or elevator shafts). FIRs are placed on and around those floors and areas in which assets will be tracked, which are typically fire floors and staging areas. Each FIR is logically tied to a floor and column. The floor and column information for each FIR can be pre-loaded into the command console or configured real-time via GUI by the Incident Commander. Although the system can provide location information when only one FIR column is deployed, deploying a larger number of FIR columns improves the location accuracy, increases the supervised area and assures redundancy needed in case any of the devices are lost due to heat or falling debris. A single FIR column will typically provide coverage of approximately 200,000 square feet per floor or provide a coverage radius of 250 feet in a typical high-rise structure while providing accurate location in more than 95% of cases. The size of the coverage area and the accuracy of located position are strongly affected by the partitioning methods and materials used on each floor. After the network of FIRs is deployed, location updates from personnel employing the use of a MeshTracker™ within the incident area are automatically reported to the Incident Command Console.

FIG. 1 is a conceptual block diagram illustrating a building 100 having a staircase 102 and elevator shaft 104 into which FIRs 106 have been deployed in the manner described above. The legend in FIG. 1 indicates the symbols for a firefighter 108, location reference FIRs 106, data links, and an Incident Commander (dispatcher) 110 at which the Incident Command Console (ICC) 111 described above is located. Besides providing the location references, the FIRs 106 assures the network connectivity across floors and between floors. If the Incident Commander is located too far from the incident area, supplemental wireless routers (not shown in this picture) must be deployed for connecting all wireless components in one network. Because they provide dual functionality, FIRs are often referred to as Wireless Routers (WR).

Figure 2:
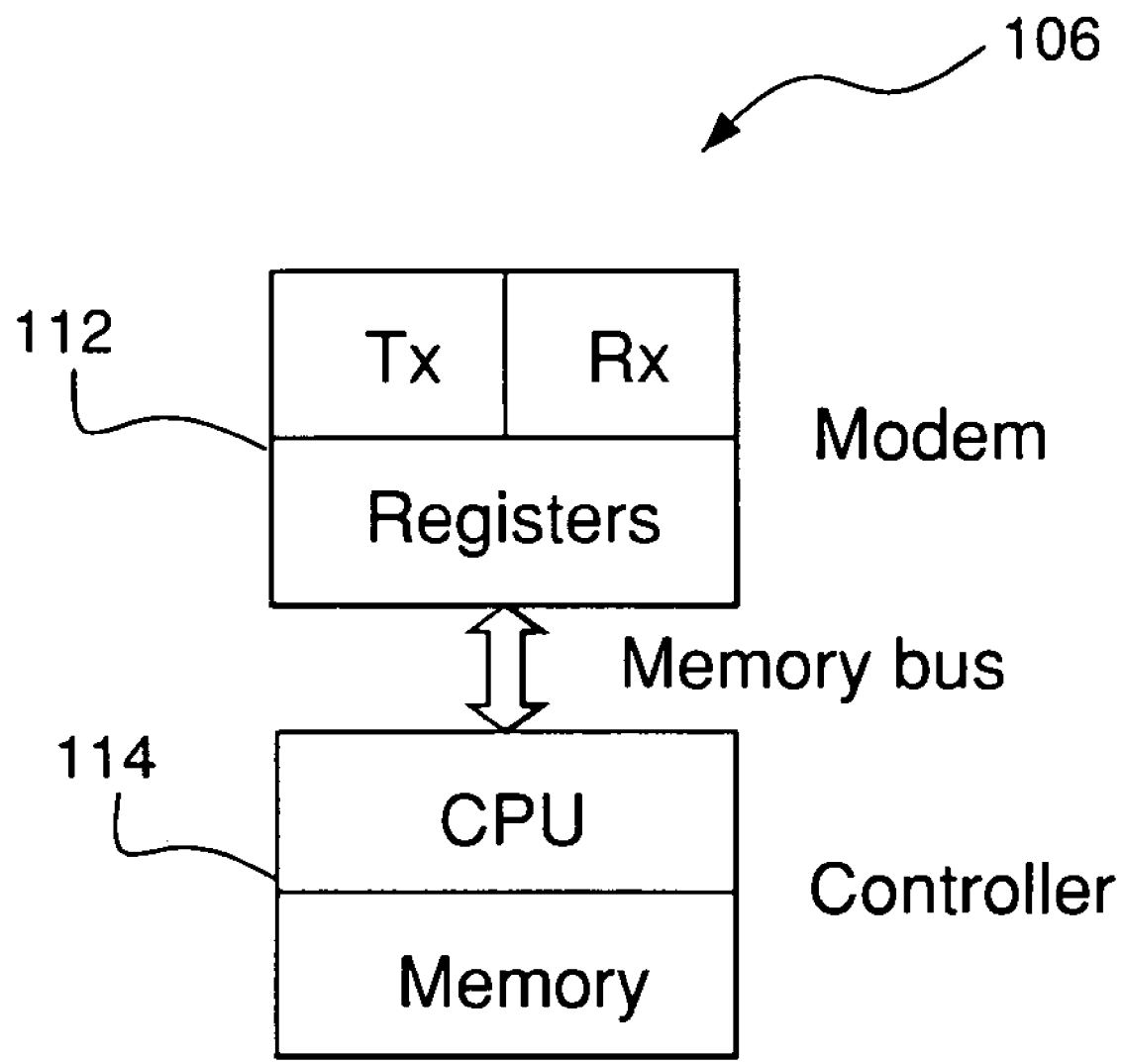
FIG. 2 is a block diagram illustrating an example of components of a wireless router employed in the system shown in FIG. 1.

FIG. 2 is a block diagram illustrating an example of components in an FIR 106. As indcted, each FIR 106 includes at least one modem 112 and a controller 114 for controlling the receiving and transmitting operations of the modem 112, as well as data storage and retrieval to and from the memory. The modem 112 in this example is a Mesh-Networks™ QDMA modem employing a MeshNetworks™ WMC6300 wireless transceiver. The FIR 106 operates as a wireless node in an ad-hoc wireless communication network as described, for example, in the patent applications referenced above. Each FIR 106, or select FIRs 106, can include sensors such as a heat sensor, CO sensor and so on, to provide information to the command console pertaining to the environment in which the FIR 106 is deployed. Accordingly, firefighters can be advised to avoid or use extreme caution in those areas that the sensors of the FIRs 106 indicate are particularly dangerous due to, for example, extreme heat.

Figure 3:
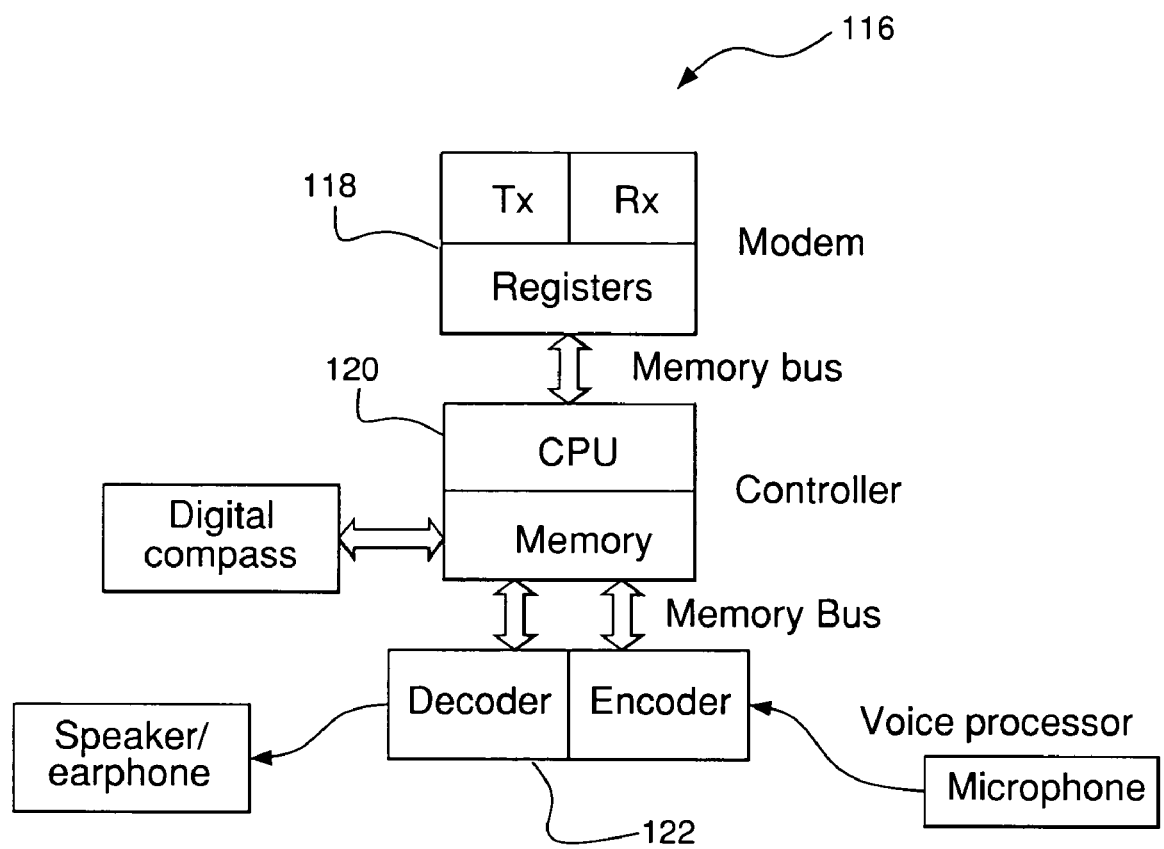
FIG. 3 is a block diagram illustrating an example of components of a mobile terminal that can be used by firefighters in the building shown in FIG. 1.

FIG. 3 is a block diagram illustrating an example of a MeshTracker™ mobile terminal (MT) 116 that can be issued to each firefighter 108 so that each firefighter 108 can use his or her mobile terminal 116 to communicate with other firefighters within the broadcast range of the mobile terminal 116, and so that all firefighters' movement can be tracked as discussed in more detail below. The mobile terminal 116 can include a headset with microphone and earphone assuring hand-free operation. A digital compass can also be included for providing orientation and a motion sensor can report if the firefighter became motionless. All these devices can be connected to the battery that is part of typical operator gear.

The microphone and the earphone of the mobile terminal 116 can be connected to a small size transceiver that has three major components, including a modem 118, a controller 120 and a voice processor 122. The software stored in the controller memory as program code and operating parameters controls the activity of all components of the mobile terminal.

The modem 118 provides radio communication with other components of the network using a transmitter and a receiver. The operation of the transmitter and receiver is controlled by storing appropriate data and code in a memory organized as a set of registers. The receiver and transmitter use the memory registers for providing feedback about the Modem status and the result of executed functions. The controller 120 is coupled to the modem 118 via a memory bus. The controller 120 includes a CPU and memory for storing data and the code of the program controlling the modem functions. This controls the modem 118 activity by writing data in modem registers via the memory bus, and reading modem registers for finding the modem status. The modem 118 in this example is a MeshNetworks™ QDMA modem employing a MeshNetworks™ WMC6300 wireless transceiver. The mobile terminal 116 operates as a mobile wireless node in an ad-hoc wireless communication network as described, for example, in the patent applications referenced above.

In addition, the voice processor 122 of mobile terminal 116 is coupled to the controller 120, and includes at least two independent components, namely, an encoder and a decoder. The encoder converts the sound received by microphone into a string of numbers, and the decoder converts the string of numbers back into sound, that is sent to a speaker or earphone. In the embodiment shown in FIG. 3, the voice processor 122 further includes access to the controller memory via a memory bus. Additionally, a digital compass can also be incorporated into the headset, which indicates the orientation of the operator's head when properly positioned, thus making it possible to identify directions using angles relative to operator current position (i.e. "twenty feet at 2 o'clock"). A motion sensor (not shown) can also be incorporated with the transceiver. It can automatically report if the firefighter does not move for some period of time. A push button can be also incorporated with the same effect as the motion sensor. The firefighter can push the button if he or she needs help. The action of pressing the button is transmitted to the transceiver software that generates a set of data messages for the Main Control, for example, the ICC 111. When receiving these messages, the main control alerts the Incident Commander indicating which firefighter needs help and what is his/her current location.

An example of the operation of the system described above in an emergency scenario will now be described.

A Rapid Intervention Crew (RIC) is attached to each firefighting operation. While the firefighters are fighting the fire, the RIC team stands ready in the event that somebody needs to be rescued. If any firefighter or a group does not answer when called, or they ask for help, the RIC enter the action and proceed to the rescue operation. First, they have to ascertain where the firefighters to be rescued are at the moment, and then proceed to rescue them. The procedure currently implemented requires that the RIC proceeds first to the last known location of the firefighters in need, from where they start searching. When the fire occurs in a multi story building, one important element of success is the ability to rapidly identify the correct floor on which the search should begin.

As is known in building construction, modern multi story buildings have concrete floor reinforced with steel, while older buildings may have floors made of another material such as wood. The absorption of radio energy is higher when the radio wave passes through concrete, and not as high when passing through wooden panels. As a result, in a building with concrete floors, radio waves may penetrate only few floors, while in a buildings with wood floors, the penetration is possible through many floors.

As discussed briefly above, FIG. 1 shows a rescue operation in progress with RIC personnel advancing on stairwell 102 (right) and elevator 104 (left). Depending on the situation, an RIC can access the building on many floors using stairs and elevators. As indicated, a wireless floor-indicating router (FIR) 106 is present in the stairwell 102 and by the elevator shaft 104 at each floor. Because the signals loose energy when passing through floors and walls, a FIR 106 may not be able to communicate with a firefighter that is not on the same floor as the FIR 106.

The RIC rescue team deploys one router on each floor when the RIC first arrives at the fire scene, which enables the RIC to find the floor number where a particular firefighter is located in just a few seconds from the moment that the emergency is declared. All FIRs 106 must be positioned as close as possible to a vertical line, which can be realized by placing the routers in the same corner of the stairwell in buildings with wooden floors, or hanging the routers on the stair rail in buildings with metallic or concrete floors. In taller buildings having one or more elevator shafts, the FIRs 106 can be deployed from elevators as they move upward. That is, when the elevator stops at each floor, the FIR 106 can be deployed close to the elevator door to insure that all FIRs 106 are positioned in as straight vertical line as possible.

As will now be discussed, the floor number is found using Time of Flight (TOF) and Received Signal Strength Indicator (RSSI) data according to an embodiment of the present invention.

The propagation of radio signals inside buildings is affected by a large number of reflections making almost impossible to determine the correct distance between the wireless FIR 106 and a firefighter using an MT. The propagation of radio signals inside buildings is also affected by a high absorption of energy when radio waves pass through floors and walls. The level of absorption depends on the thickness and composition of the obstruction. Concrete walls and floors reinforced with steel have an elevated level of absorption, while wood or dry wall have a smaller effect on radio wave energy. Because the media is not homogeneous, computing the exact distance between the firefighter and the wireless router based on RSSI is nearly impossible.

The system and method according to the embodiment of the present invention described herein uses both TOF and RSSI for identifying the floor where the firefighter is located. The RSSI and TOF values received from all routers are filtered before being used for the evaluation of the floor number. Although the RSSI and TOF data may not show the correct distance to the firefighter, the filtered data can be compared for finding the floor where is located the FIR that provides to the targeted mobile device the smallest TOF and the best RSSI simultaneously.

The operations shown in the flowcharts set forth in FIGS. 4–7 provide a technique for setting a score to each floor and selecting the floor with the best score. The same technique is used for setting the score according with TOF and RSSI data. That is, the technique looks first for the smallest value of TOF (or smallest absolute value of RSSI) divided by the number of measurements performed between a mobile terminal 116 and FIRs 106 whose signals the mobile terminal 116 can receive. The FIR 106 giving the smallest value of weighted TOF is representative of the most likely floor on which the MT 116 is located, and its score is set to the maximum value. The next likely floor is found by searching again for the smallest value of the TOF divided by the number of measurements, from the rest of the floors. The method is applied until all floors have been searched and a score has been assigned for each floor. If the searching values found on two floors are almost equal (for example, the values are within 5% difference of each other), the scores of the two floors is set as equal. After computing the score of each floor based on RSSI and TOF, a general score is computed by adding both RSSI and TOF scores. The floor matching the largest score is nominated as the floor where the firefighter is located.

The Floor Identification shown in FIGS. 4–7 algorithm works in real time. As discussed above, each firefighter has a subscriber device (i.e., an MT 116) as part of his or her gear. The Incident Commander, for example, a senior fire captain or chief, has a computer, such as a MEA™ Incident Command Console 111 as described above, which displays the position of each firefighter continuously as shown, for example, in FIGS. 8–19.

It is noted that each MT 116 exchanges range messages with all wireless routers (i.e., FIRs 106) with which it can communicate. When the MT 116 determines that the list of FIRs 106 within its broadcast range, the MT 116 transmits information (e.g., a data packet) to the Incident Commander Computer (ICC) 111 including the list of FIRs 106, the TOF to each of them and the RSSI of received signals from each FIRs 106 within the propagation range. The ICC 111 can be located in the Command Console 110 which is discussed above. The ICC 111 receives data from the FIRs 106 and MTs 116, through the multi-hopping capabilities of the ad-hoc network, performs the computation of floor numbers and displays the floor number where each firefighter is located. The real time process with GUI output requires three different components: Initialization; Data Collection, and Computation with GUI update.

Figure 4:
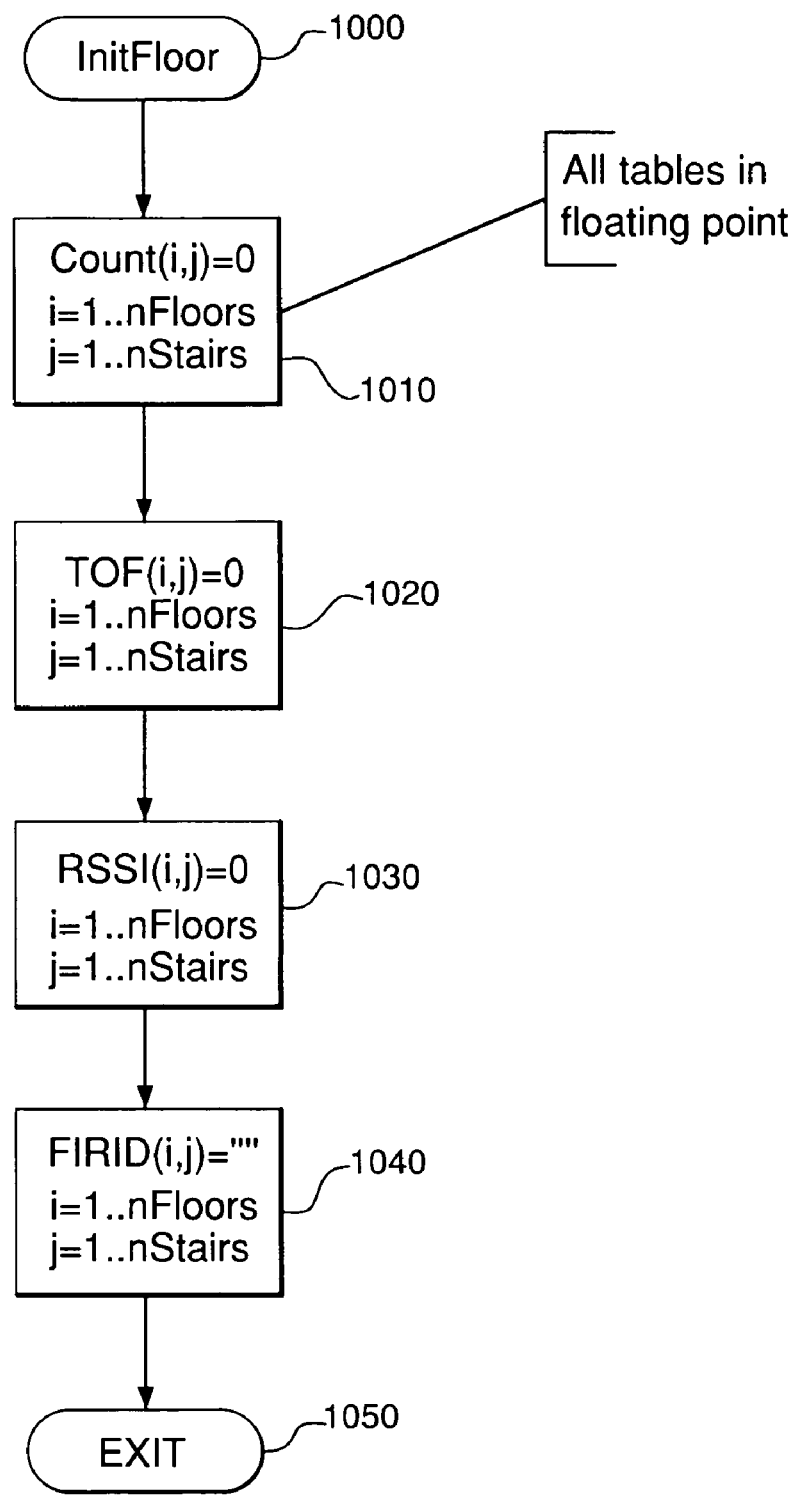
FIG. 4 is a flowchart showing an example of the initialization operations performed for identifying the locations of mobile terminals in the system shown in FIG. 1 according to an embodiment of the present invention.

The Initialization operations are run when the ICC 111 is started. An example of the initialization operations are shown in FIG. 4.

As part of the initialization the number of floors (nFloors) and the number of stairwells (nStairs) in the building 100 is established in step 1000, as well as other information not strictly related with the computation of the floor number and not presented here. In step 1010, 1020, 1030 and 1040, the values of the variables Count, TOF, RSSI and FIRID are all erased (i.e., set to zero, but FIRID is set to a blank because it is a text variable). The initialization process exits at step 1050.

Figure 5:
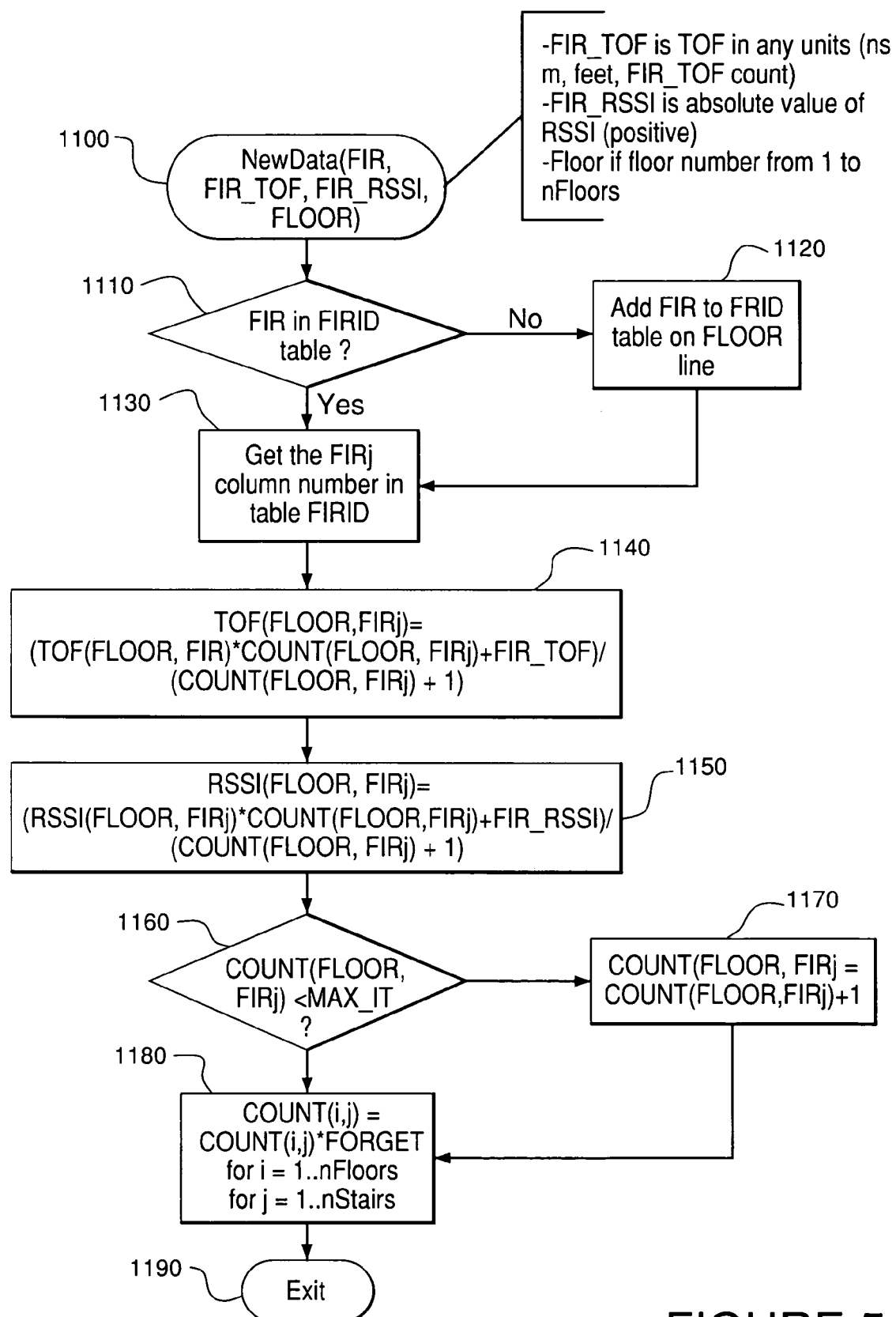
FIG. 5 is a flowchart showing an example of the data collection operations performed for identifying the locations of mobile terminals in the system shown in FIG. 1 according to an embodiment of the present invention.

When MTs 116 have data available, they forward data packets to the ICC 111. Therefore the Data Collection task shown in FIG. 5 is activated when data is received. The ICC GUI must be updated periodically for keeping the IC informed about the progress of operations. Therefore, the update of the GUI, which must be preceded by the computation of the floor number, is activated by a periodic timer. The application maintains its own data structures. This data structure has four components each with as many lines as nFloors and as many columns as nStairs.

The variables and arrays represented in FIGS. 4–7 will now be briefly described.

FIRID (which stands for FIR IDentification) is an array with the identifiers of each FIR 106. Each FIR Identification is associated with the floor number where the FIR was deployed. It means that all FIRs deployed on the same floor are on the same line of the matrix, regardless the position on the floor. Since the MT 116 may not be able to communicate with all FIRs on the same floor due to radio energy absorption, some of the positions in FIRID table may remain unused. As the firefighter moves around the building, new FIR identifiers are added to the table, but old FIRs identifiers are not removed.

The Count matrix contains the count of the number of range messages the SD reports for each FIR.

The RSSI and TOF tables have the same structure as FIRID. They contain the filtered value of the RSSI and TOF recorded for each FIR.

The flowchart in FIG. 5 shows the data collection function. The function name is NewData and is activated beginning at step 1100 every time a new set of data is received from an MT. The NewData function has 4 parameters, which are FIR representing the identification of the FIR from where data has been collected; FIR_TOF representing the last TOF to the FIR; FIR_RSSI representing the absolute value of the RSSI for last received message; and FLOOR representing the floor number where the FIR is deployed.

The data collection function finds the position of the FIR identification in FLOOR line of the FIRID table. If it is a new identification as determined in step 1110, the new FIR identification is added to the table on the first empty position in step 1120. The FIRj is the column of the FIR identification on the FLOOR line as indicated in step 1130.

The TOF and RSSI values are filtered initially using a variable size window of size Count as indicated in steps 1140 and 1150. When the number of messages exchanged between the MT and FIR becomes larger than a predefined value MAX_IT, the filter changes into an Infinite Input Filter with a rate of 1/(MAX_IT+1). The effect is achieved by limiting the values of Count table from becoming larger than MAX_IT by steps 1160 and 1170 as indicated.

Step 1180 of the flowchart assures that the algorithm "forgets" data collected too long ago. Such "forget ness" is needed because the firefighter can move away from one FIR and approaches another FIR, causing the collected values of TOF and RSSI to change accordingly with firefighter's new position. The algorithm forgets faster or slower, depending on the value of the FORGET factor, which is always a number between zero and 1. If it is zero, the algorithm does not remember anything. If the factor is one, the algorithm remembers everything. For this application, the most usual values are 0.99 or 0.999, depending on the frequency of collecting data from FIRs. The data collection process then ends at step 1190.

Figure 6:
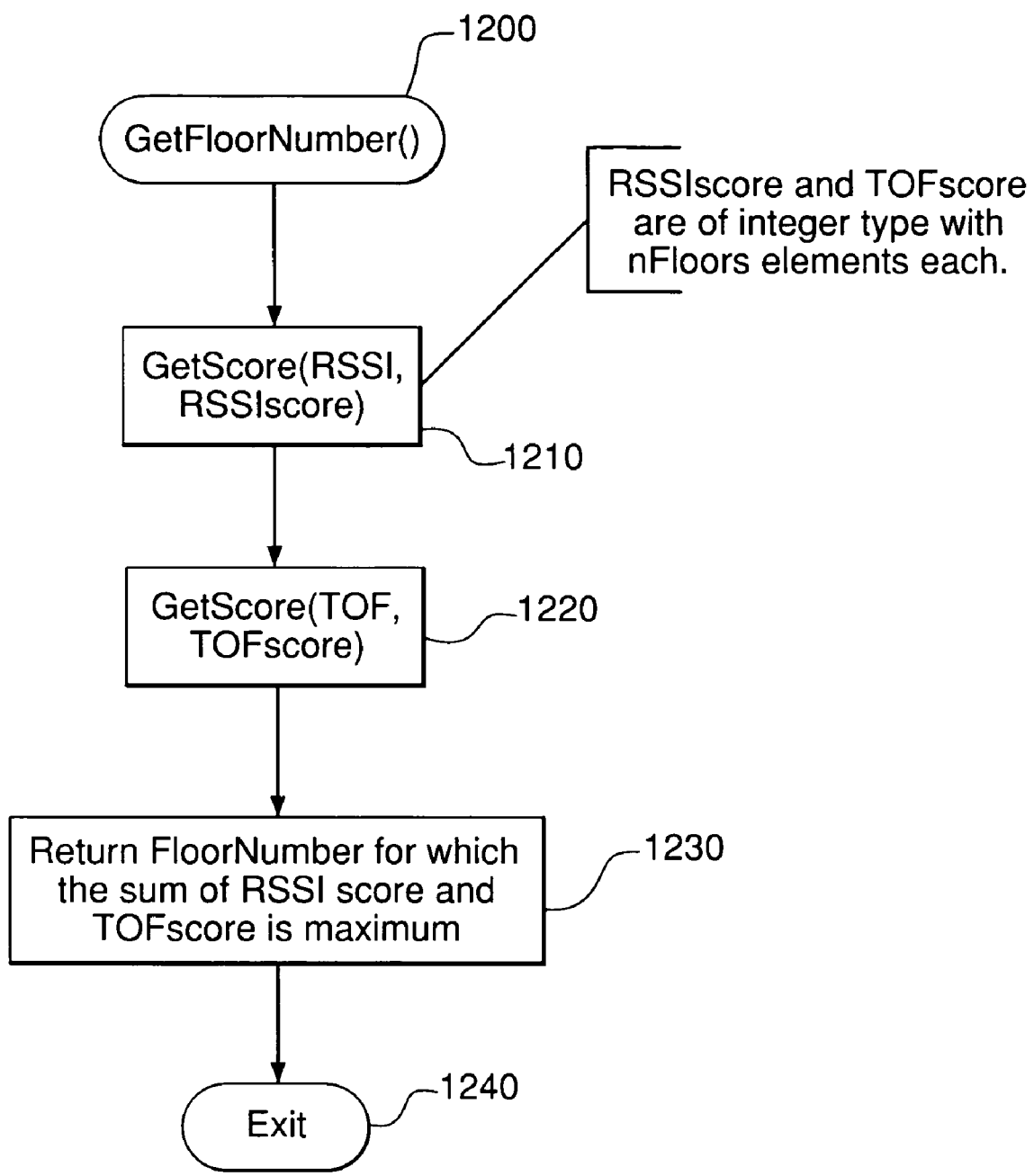
FIG. 6 is a flowchart showing an example of the floor number calculation operations performed for identifying the locations of mobile terminals in the system shown in FIG. 1 according to an embodiment of the present invention.

The flowchart in FIG. 6 shows the function GetFloor-Number for computing the floor number of the firefighter. The function begins in step 1200 and uses two local integer arrays with as many elements as the number of floors nFloors. The function calls the GetScore function twice for computing the RSSIscore in step 1210 and the TOFscore in step 1220. The combined score provides more accurate estimation of the probable floor than each independent criterion. It was measured that due to reflections inside buildings, the TOF is affected by errors as large as 30 meters. Considering that the distance between floors is between 3 and 6 meters, a 30 meter error implies an error in floor number estimate between 5 and 10 floors. The RSSI shows the strength of the signal the MT receives from an FIR. All FIRs are transmitting at the same power, but the path length of each signal is different due to different partitioning of each store and the fact that the absorption of the floor is very different from absorption of walls. Furthermore, the number of walls between an MT and the FIRs it communicates with depends on each floor partitioning method; therefore, it is different from one FIR to the next. For this reason, the RSSI information cannot be used by itself for finding the floor number. Accordingly, the algorithm computes a score for each floor, then selects the floor that provides the highest additive score using both criteria. The tests showed that the results are exceptionally accurate. Step 1230 of the flowchart finds the floor number based on the largest score computed by adding the RSSIscore with the TOFscore for each floor. The process ends in step 1240.

Figure 7:
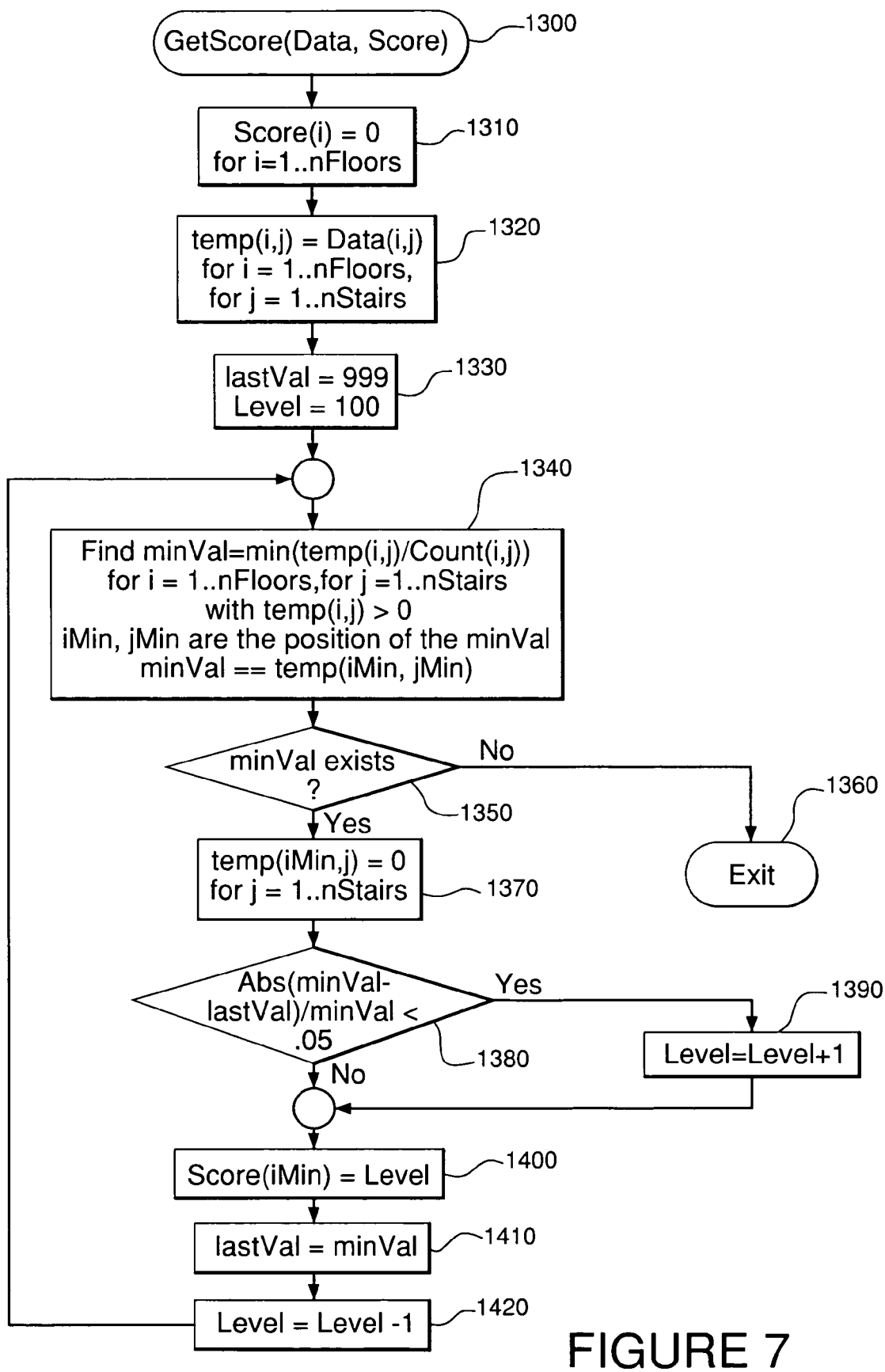
FIG. 7 is a flowchart showing an example of the floor scoring operations performed for identifying the locations of mobile terminals in the system shown in FIG. 1 according to an embodiment of the present invention.

FIG. 7 illustrates an example of a flowchart of the GetScore function. This function is called by steps 1210 and 1220 discussed above in FIG. 6 with RSSI and RSSIscore as parameters, and then with TOF and TOFscore as the parameters. The function computes the score of each floor according to each criterion.

After beginning in step 1300, the function starts by setting all Score values to zero in step 1310, and then makes a copy of the Data (RSSI or TOF) into a temporary storage temp in step 1320. The lastVal and Level are also initialized in step 1330. The value of the Level variable is not important, but it must be the same for both RSSI and TOF.

The function has a loop that identifies the floor on which the criterion (RSSI or TOF) has the best value. Once the floor was found in step 1340, all other data from the same floor are ignored and the next floor is identified. As long as a floor needing identification remains as determined in step 1350, the function continues. However, if no such floor remains, the function exits in step 1360.

During the execution of the algorithm, the content of temp is destroyed in step 1370. For this reason, the content of Data was copied into temp in step 1320.

If two floors have values that have a difference smaller than 5% of the value, they receive the same Score by keeping the same value for Level variable as indicted in steps 1380, 1390 and 1400. If the values are different, the score on each floor is different because the value of Level is decreased with each found floor in step 1420. In step 1410, the lastVal shows the previous value of the minVal, the minimum value of the criterion. The same result can be obtained if for each floor is found the minimum value and the score is set according with the results of sorting these minimal values.

Figure 8:
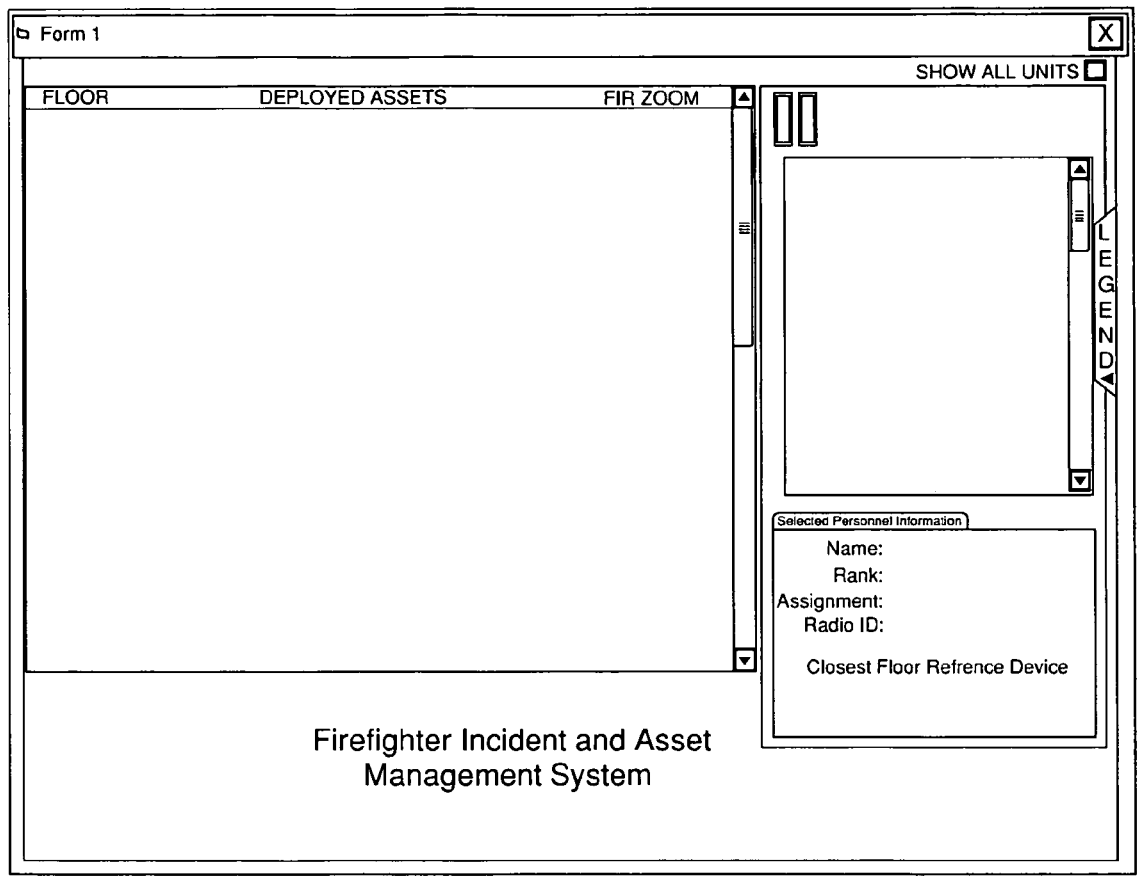
FIGS. 8–19 illustrate examples of display screens generated by the Incident Commander Console (ICC) based on the locations of the firefighters determined in accordance with the embodiment of the present invention demonstrated in FIGS. 1–7.
Figure 9:
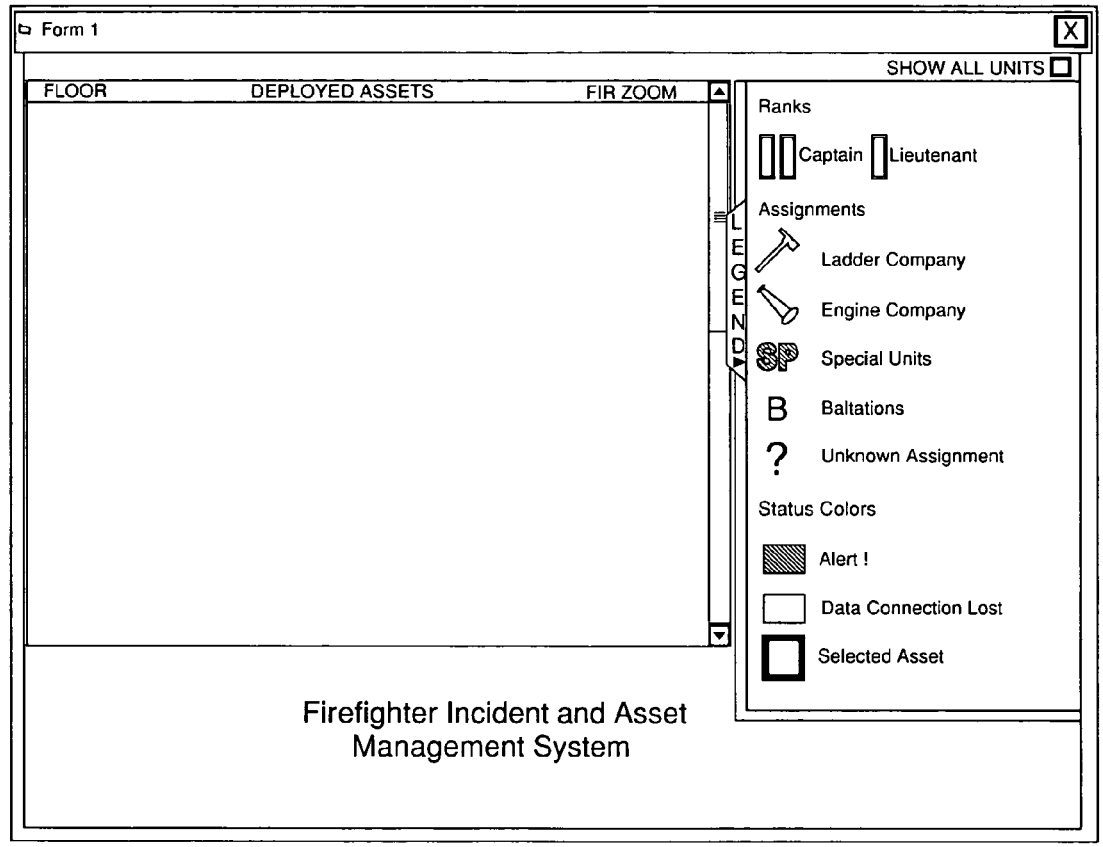
Figure 10:
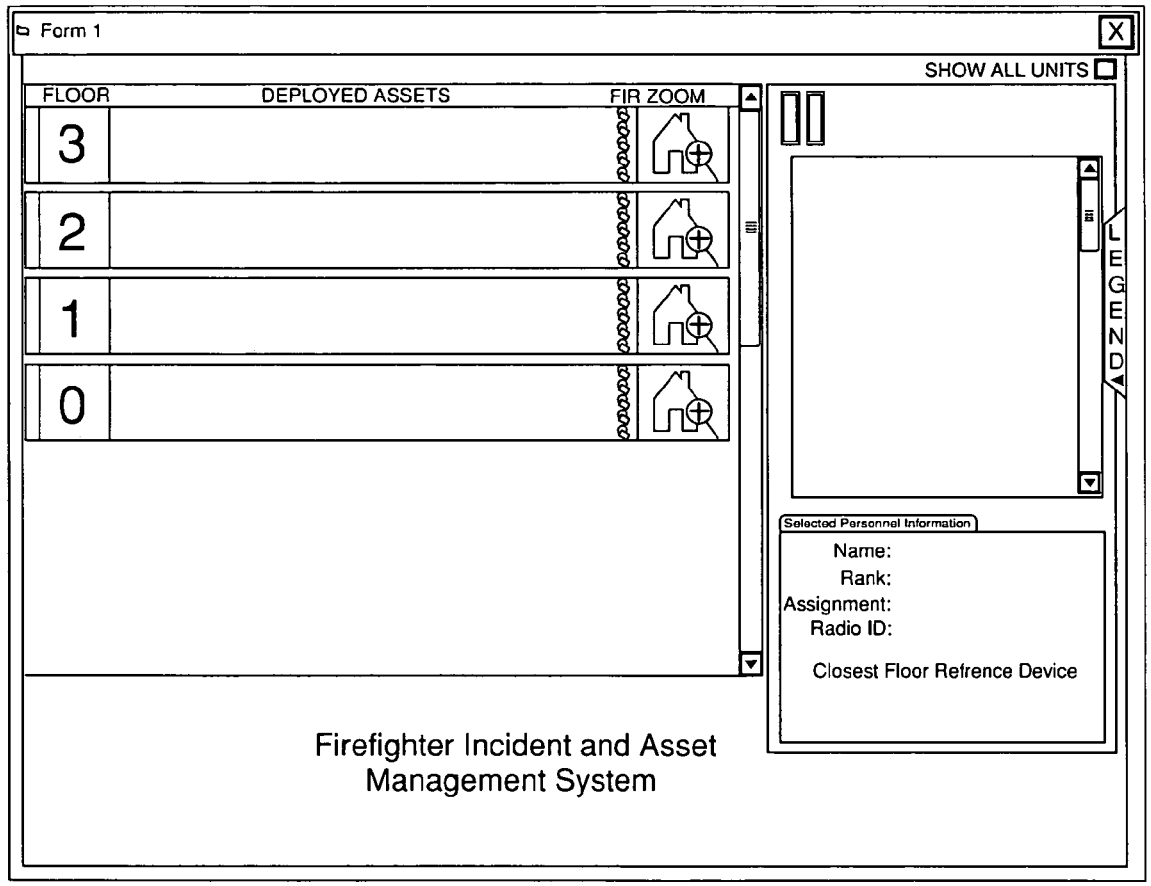
Figure 11:
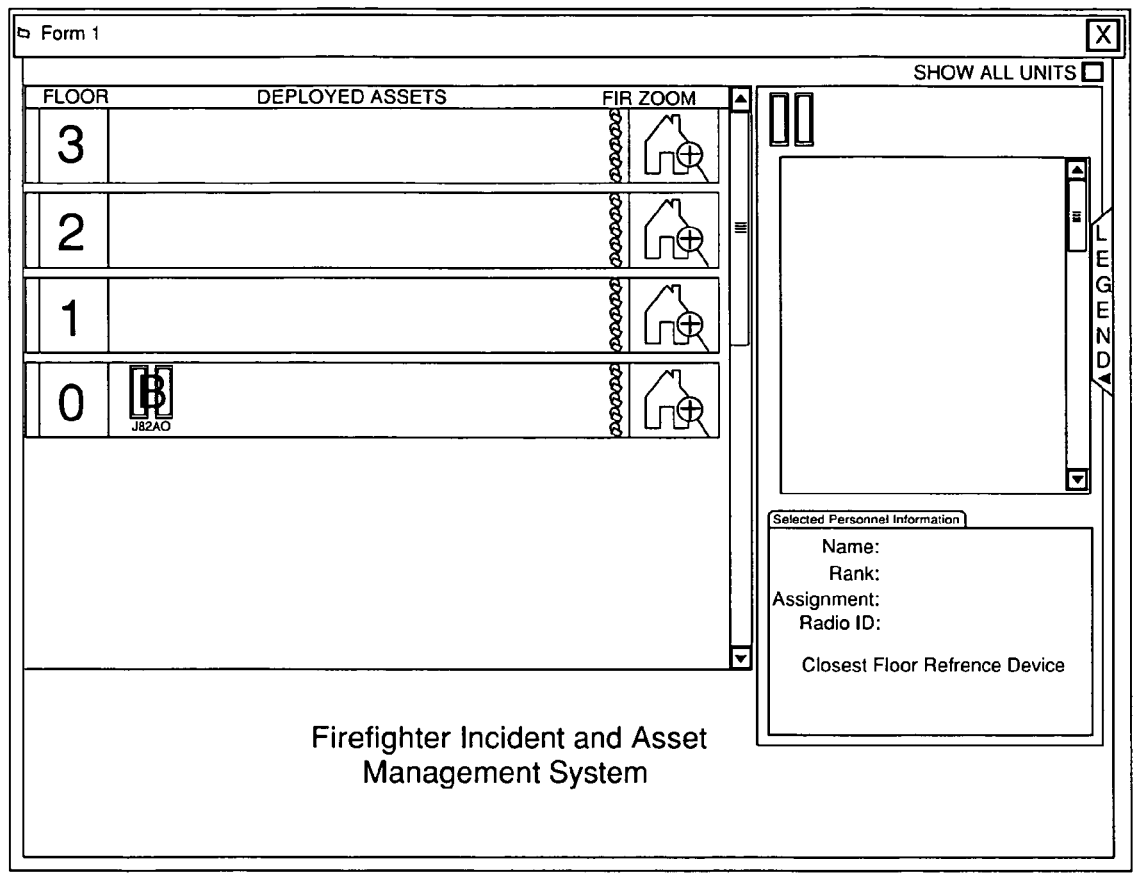
Figure 12:
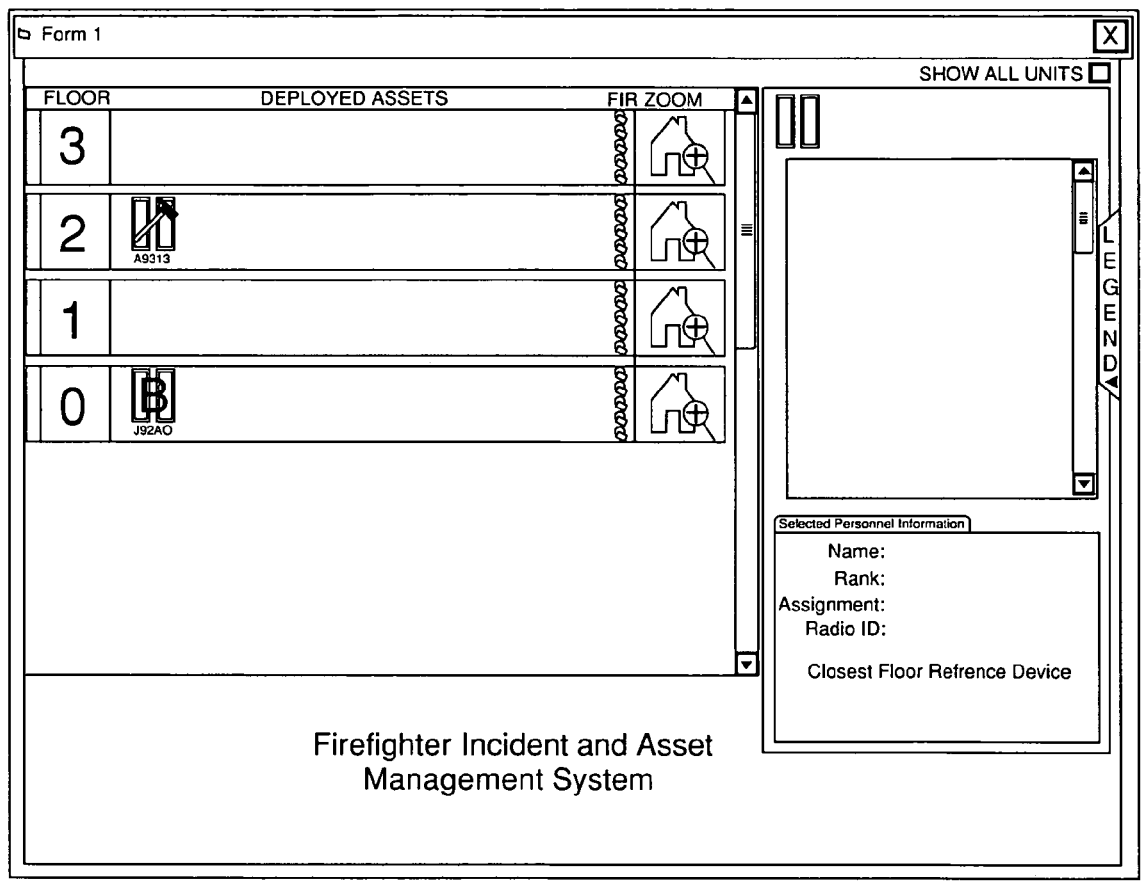
Figure 13:
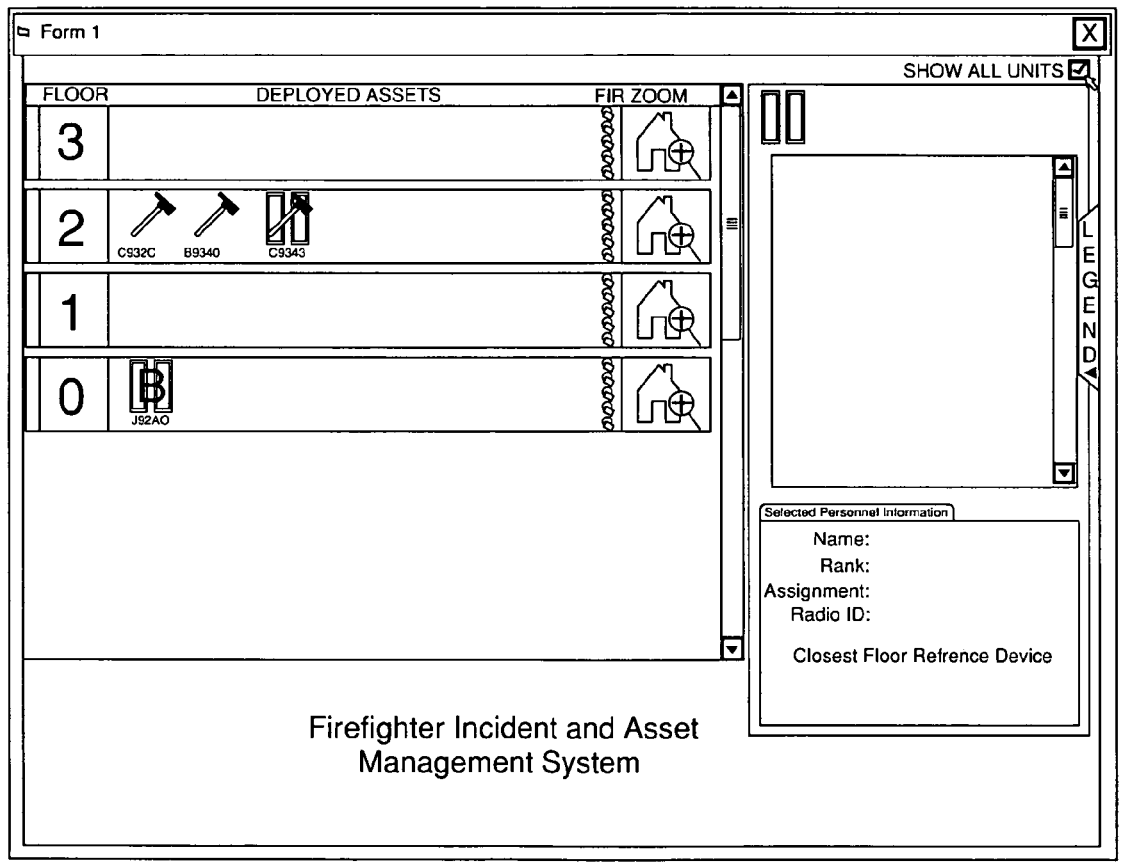
Figure 14:
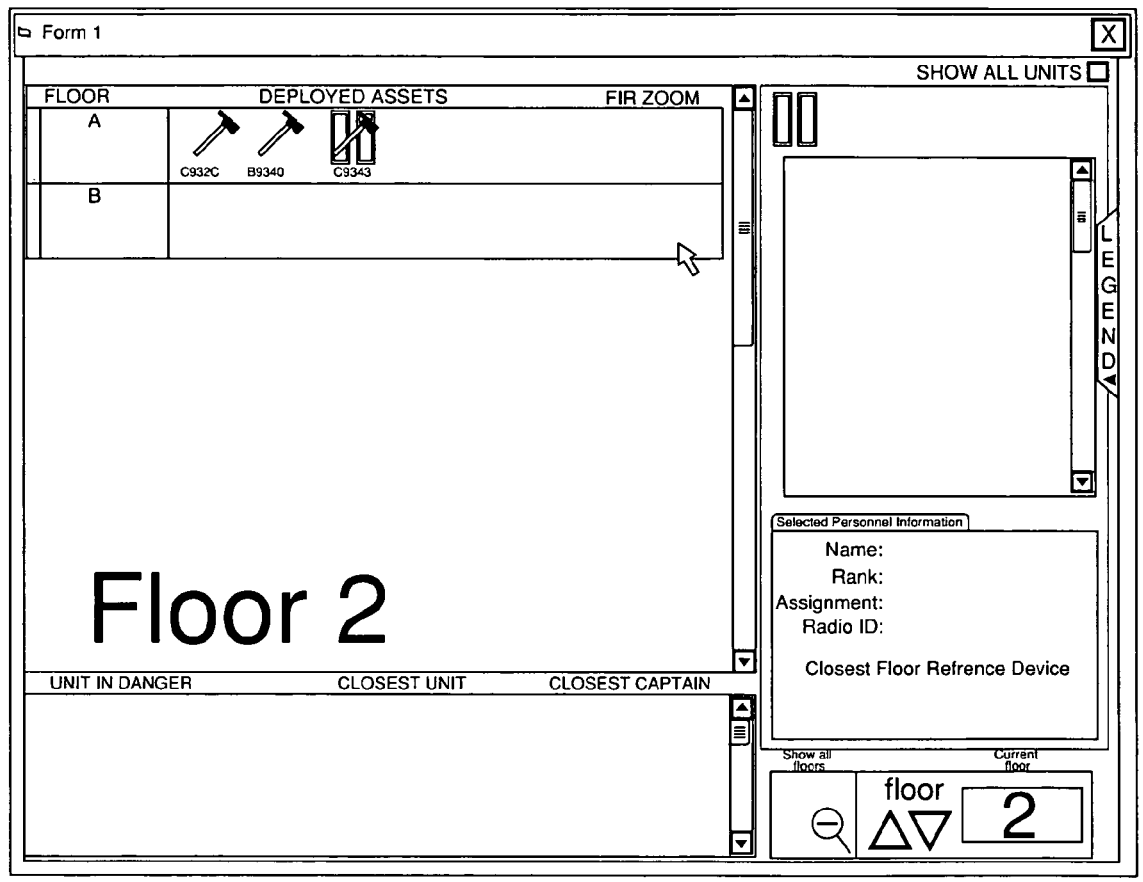
Figure 15:
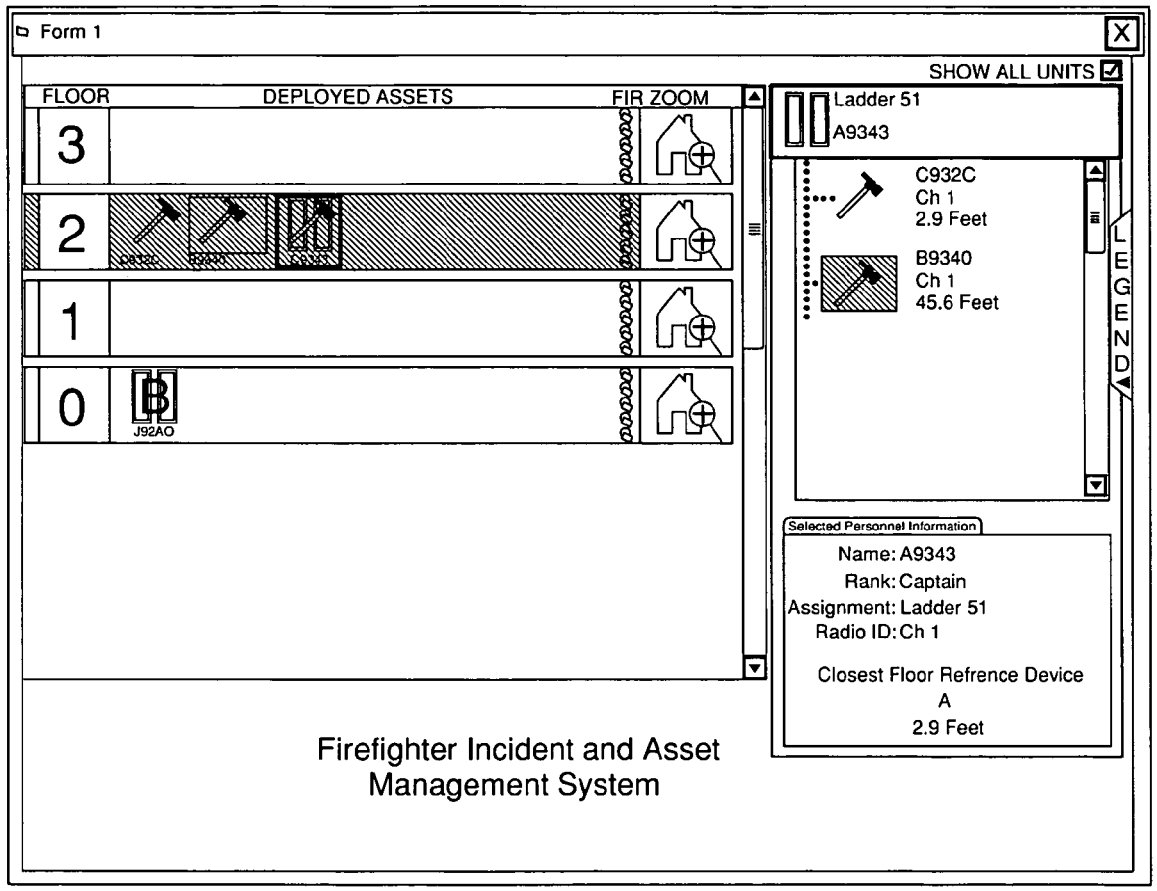
Figure 16:
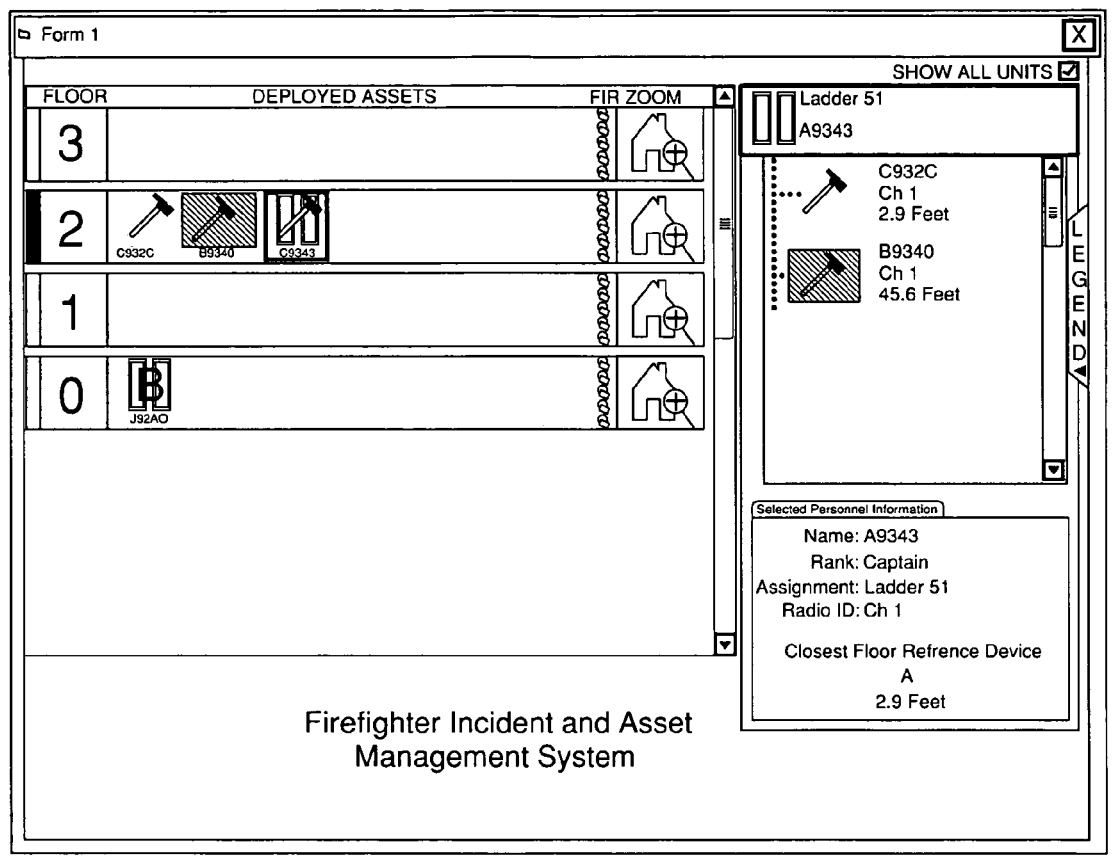
Figure 17:
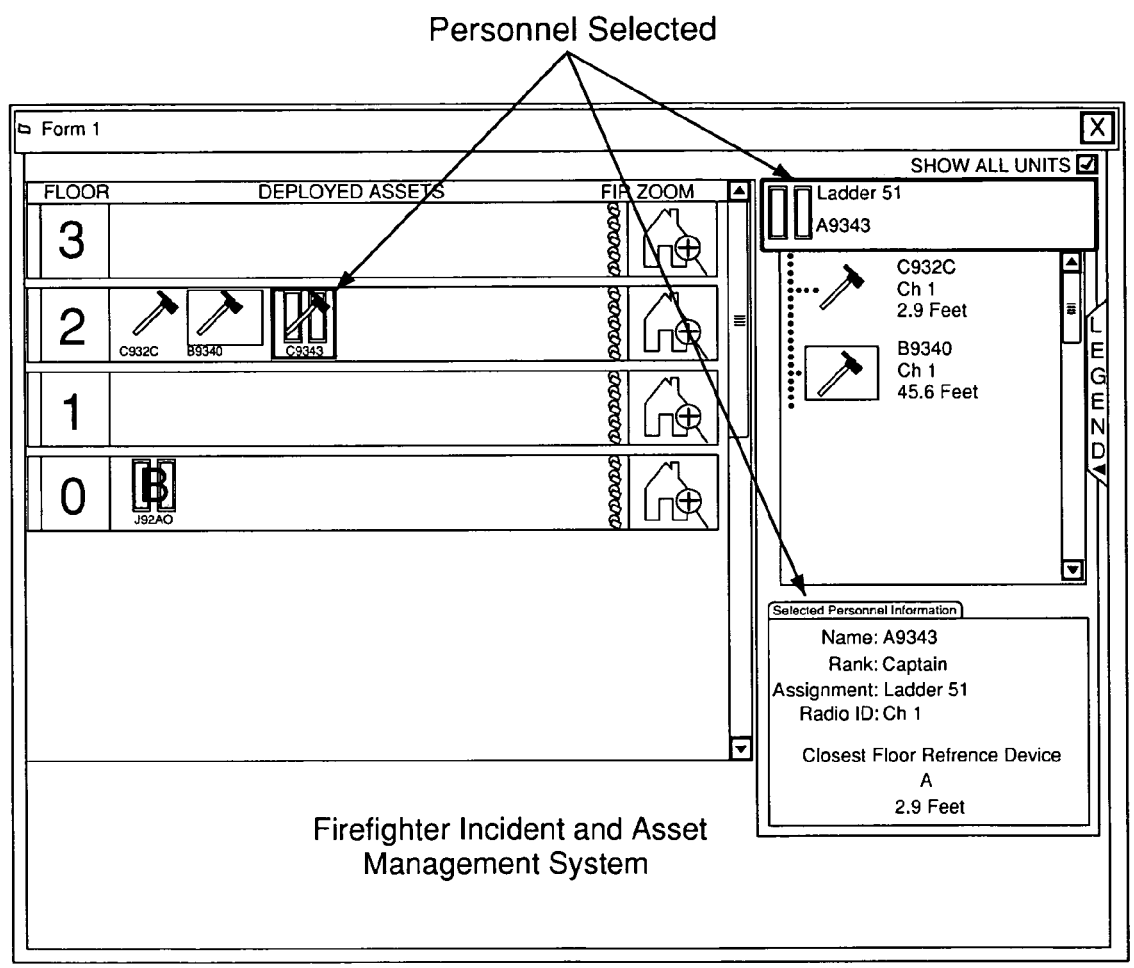
Figure 18:
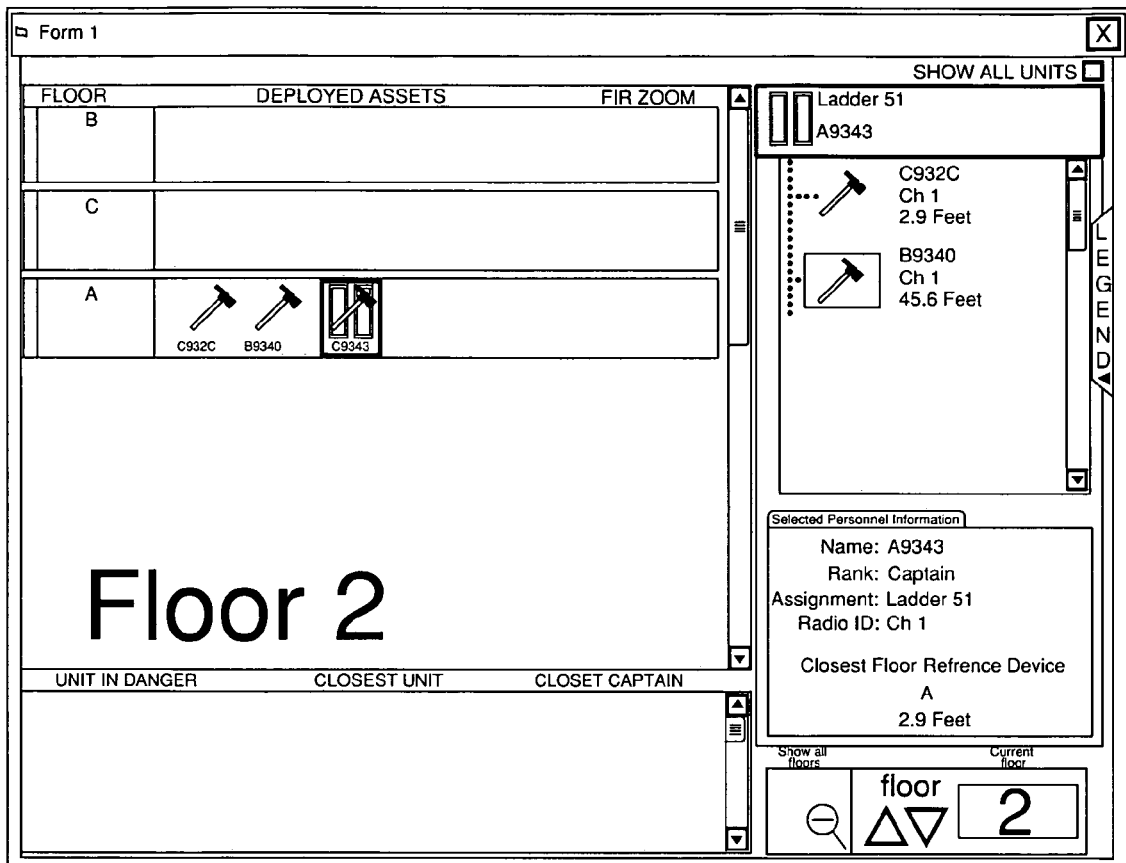
Figure 19:
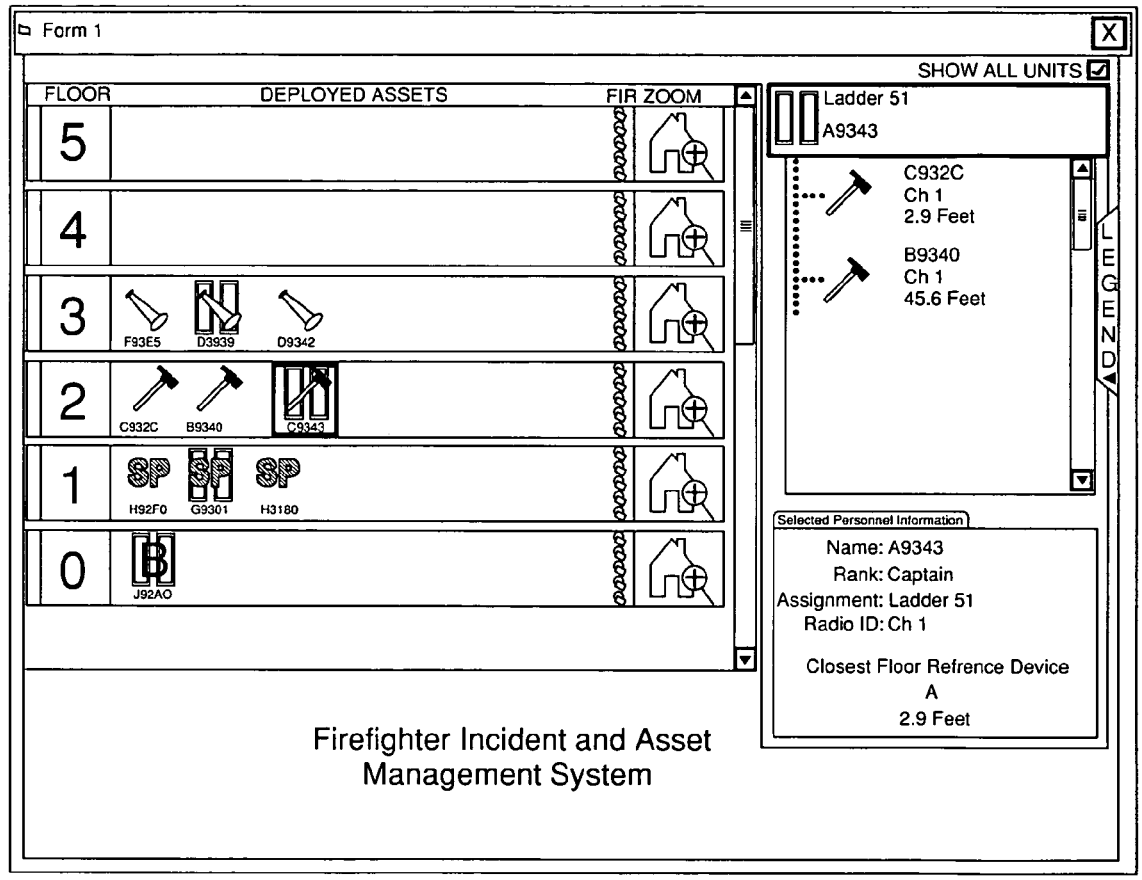

As stated above, FIGS. 8–19 illustrate examples of display screens generated by the ICC based on the locations of the firefighters determined in the manner discussed above. For example, FIG. 8 illustrates the initial display window prior to firefighters entering a building, and FIG. 9 shows the initial display window with the "Legend Tab" expanded to show the symbols that can be displayed on the display window representing the different types of personnel and conditions. FIG. 10 illustrates a display of four stories of a building having FIRs deployed on each floor, and FIG. 11 illustrates a symbol (captain's bars) indicating that a battalion commander has entered the staging floor, which is the bottom floor, or "floor 0" of the building using the European floor numbering convention. FIG. 12 illustrates that a ladder unit has entered floor 2 of the building, and FIG. 13 shows the details of the three personnel of that ladder unit on floor 2 (i.e., one captain and two firefighters). FIG. 14 shows an expanded display view of floor 2. FIG. 15 shows an alarm condition on floor 2, and FIG. 16 shows that that alarm has been acknowledged. FIG. 17 illustrates the details of the selected personnel (in this example, the captain), and the distance from the captain to the closest FIR 106. In this example, the captain is 2.9 feet from the FIR 106 designated "A". FIG. 18 illustrates an example of the display when an FIR (in this case, the FIR designated 2C) loses signal, meaning that it may have become damaged or destroyed. FIG. 19 illustrates an example of a multi-floor display and the personnel on each floor. Naturally, the system can be modified to display the information in any desirable format.

In the embodiments of the present invention described above, the system and method provides accurate position of the mobile network members and allows voice exchange between members of the team involved in operation. Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A system for monitoring movement in a three-dimensional multi-level structure, comprising:

a plurality of mobile wireless remote terminals, adapted to communicate in a wireless multi-hopping communication network; and a plurality of wireless routers, deployable in the three-dimensional area, and adapted to communicate in the wireless multi-hopping communication network;

each of the mobile wireless remote terminals being adapted to exchange signals with any of the routers within its broadcast range and, based on those signals, being adapted to determine its respective closest router and a respective floor identifier that identifies a respective floor on which the mobile wireless remote terminal is present in the three-dimensional structure;

wherein said each mobile wireless remote terminal uses time of flight (TOF) data and received signal strength indicator (RSSI) data pertaining to the signals received from said any of the routers within its broadcast range to determine the floor on which it is present in the three-dimensional structure;

wherein the three-dimensional structure is a building, and the routers are deployed on respective floors of the building; and said each mobile wireless remote terminal assigns respective scores to each floor based on the TOF data and RSSI data pertaining to the signals, and determines the floor on which it is present based on the scores.

2. A system as claimed in claim 1, wherein:

said each mobile terminal identifies the floor on which it is present as the floor having the lowest score.

3. A system as claimed in claim 1, wherein:

said each mobile wireless remote terminal uses the TOF data and the RSSI data pertaining to the signals received from the routers within a certain time proximate to a time at which it determines the floor on which it is present based on the TOF data and the RSSI data, and refrains from using the TOF data and the RSSI data pertaining to the signals received prior to the certain time.

4. A system as claimed in claim 1, further comprising:

a control console, adapted to receive information from the mobile terminals pertaining to their respective determined locations, and to generate a display illustrating positions of the mobile terminals in the three-dimensional structure.

5. A system as claimed in claim 4, wherein:

the three-dimensional structure is a building, and the routers are deployed on respective floors of the building; and the control console is adapted to generate the display illustrating the respective locations of the respective mobile terminals on the floors of the building, as well as the respective floor identifiers indicating respective floor numbers on which the respective mobile terminals are present, and the respective closest routers for each of the respective mobile terminals.

6. A system as claimed in claim 4, wherein:

said each mobile terminals includes a respective motion sensor and said each mobile terminal transmits data received from its respective motion sensor to the control console; and the control console is adapted to generate an alarm condition identifying a particular mobile terminal if the data received from a motion sensor associated with that mobile terminal indicates that that mobile terminal has not moved for a certain period of time.

7. A system as claimed in claim 4, wherein:

said each mobile terminal includes a transmitter adapted to transmit at least one of voice and video data to the control console.

8. A method for monitoring movement in a three-dimensional multi-level structure, comprising:

deploying a plurality of mobile wireless remote terminals in the three-dimensional structure, each of the mobile wireless remote terminals being adapted to communicate in a wireless multi-hopping communication network;

deploying a plurality of wireless routers in the three-dimensional structure, each of the wireless routers being adapted to communicate in the wireless multi-hopping communication network;

controlling each of the mobile wireless remote terminals to exchange signals with any of the routers within its broadcast range and, based on those signals, to determine its respective closest router and a respective floor identifier that identifies a respective floor on which the mobile wireless remote terminal is present in the three-dimensional structure;

wherein said each mobile wireless remote terminal uses time of flight (TOF) data and received signal strength indicator (RSSI) data pertaining to the signals received from said any of the routers within its broadcast range to determine the floor on which it is present in the three-dimensional structure;

wherein the three-dimensional structure is a building, and the router deploying step deploys the routers on respective floors of the building; and the controlling step include controlling said each mobile wireless remote terminal to assign respective scores to each floor based on the TOF data and RSSI data pertaining to the signals, and to determine the floor on which it is present based on the scores.

9. A method as claimed in claim 8, wherein:

said each mobile terminal identifies the floor on which it is present as the floor having the lowest score.

10. A method as claimed in claim 8, wherein:

the controlling step includes controlling said each mobile wireless remote terminal to use the TOF data and the RSSI data pertaining to the signals received from the routers within a certain time proximate to a time at which it determines the floor on which it is present based on the TOF data and the RSSI data, and to refrain from using the TOF data and the RSSI data pertaining to the signals received prior to the certain time.

11. A method as claimed in claim 8, further comprising:

deploying a control console, adapted to receive information from the mobile terminals pertaining to their respective determined locations, and to generate a display illustrating positions of the mobile terminals in the three-dimensional structure.

12. A method as claimed in claim 11, wherein:

the three-dimensional structure is a building, and the routers are deployed on respective floors of the building; and the control console is adapted to generate the display illustrating the respective locations of the respective mobile terminals on the floors of the building, as well as the respective floor identifiers indicating respective floor numbers on which the respective mobile terminals are present, and the respective closest routers for each of the respective mobile terminals.

13. A method as claimed in claim 11, wherein:

said each mobile terminals includes a respective motion sensor and said each mobile terminal transmits data received from its respective motion sensor to the control console; and the control console is adapted to generate an alarm condition identifying a particular mobile terminal if the data received from a motion sensor associated with that mobile terminal indicates that that mobile terminal has not moved for a certain period of time.

14. A method as claimed in claim 11, wherein:

said each mobile terminal includes a transmitter adapted to transmit at least one of voice and video data to the control console.

15. A method as claimed in claim 8, wherein:

the router deploying step deploys the routers in the three-dimensional structure before the mobile terminals are deployed in the three-dimensional structure.

16. A method as claimed in claim 8, wherein:

the router deploying step deploys the routers in the three-dimensional structure while the mobile terminals are being deployed in the three-dimensional structure.

* * * * *